(12) United States Patent
Kurata et al.

(10) Patent No.: US 6,822,737 B2
(45) Date of Patent: Nov. 23, 2004

(54) PRETILT ANGLE MEASURING METHOD AND MEASURING INSTRUMENT

(75) Inventors: Tetsuyuki Kurata, Hyogo (JP); Takahiro Nishioka, Hyogo (JP); Yoshihiro Togashi, Aichi (JP); Susumu Sato, Akita (JP)

(73) Assignees: Meiryo Technica Corporation, Aichi (JP); Mitsubishi Denki Kabushiki Kaisha, Tokyo (JP)

( * ) Notice: Subject to any disclaimer, the term of this patent is extended or adjusted under 35 U.S.C. 154(b) by 69 days.

(21) Appl. No.: 10/009,937
(22) PCT Filed: Apr. 6, 2001
(86) PCT No.: PCT/JP01/02994
§ 371 (c)(1),
(2), (4) Date: Jun. 4, 2002
(87) PCT Pub. No.: WO01/77616
PCT Pub. Date: Oct. 18, 2001

(65) Prior Publication Data
US 2003/0071995 A1 Apr. 17, 2003

(30) Foreign Application Priority Data

Apr. 11, 2000 (JP) ........................................ 2000-109889
Oct. 12, 2000 (JP) ........................................ 2000-312529

(51) Int. Cl.$^7$ ................................................ G01J 4/00
(52) U.S. Cl. ................................................ 356/364
(58) Field of Search .............................. 356/364–367; 250/225; 357/93, 94

(56) References Cited

U.S. PATENT DOCUMENTS

| | | | | |
|---|---|---|---|---|
| 5,903,352 A | * | 5/1999 | Ohsaki et al. | 356/364 |
| 6,317,208 B1 | * | 11/2001 | Hirosawa | 356/364 |
| 6,348,966 B1 | * | 2/2002 | Hirosawa | 356/364 |
| 6,473,180 B2 | * | 10/2002 | Hirosawa | 356/364 |
| 6,490,036 B2 | * | 12/2002 | Hirosawa | 356/364 |

* cited by examiner

Primary Examiner—Michael P. Stafira
(74) Attorney, Agent, or Firm—Patterson, Thuente, Skaar & Christensen, P.A.

(57) ABSTRACT

An apparatus for detecting a pretilt angle is comprised of a light source 1, a polarizer 2, a liquid-crystal cell 3, a quarter-wave plate 4, an analyzer 5, a photodetector 6, and a processing device. The processing device receives from the photodetector transmitted light intensities of light that is transmitted through the liquid-crystal cell 3 at a plurality of light incident angles. The processing device calculates Stokes parameters corresponding to the plurality of light incident angles based upon the transmitted light intensity corresponding to the plurality of light incident angles. Furthermore, an apparent retardation corresponding to the plurality of light incident angles is determined based upon the Stokes parameters corresponding to the plurality of light incident angles. The pretilt angle of the liquid-crystal cell 3 is determined based upon the determined apparent retardation corresponding to the plurality of light incident angles.

14 Claims, 7 Drawing Sheets

PRETILT ANGLE MEASURING METHOD AND MEASURING INSTRUMENT

TECHNICAL FIELD

The present invention relates to methods and apparatus for detecting a pretilt angle of an element in which the direction of orientation of molecules is twisted between a light incident side and a light outgoing side.

BACKGROUND TECHNOLOGY

Liquid-crystal display devices using liquid-crystal cells have been widely used in monitors and displays due to their characteristics, such as low weight, small thickness, and low energy consumption. The display principle of liquid-crystal cells is based upon the fact that the direction of orientation of liquid crystal molecules changes and the polarization state of the incident light on the liquid-crystal cell is modulated when a voltage is applied across the liquid-crystal cell.

Various types of liquid-crystal cells utilized in liquid-crystal displays are known. Twisted nematic liquid-crystal cells (herein referred to as "TN liquid-crystal cells") and super twisted nematic liquid-crystal cells (herein referred to as "STN liquid-crystal cells") have been widely used.

TN liquid-crystal cells are cells in which the liquid-crystal molecules are oriented parallel to the substrate surface, but the orientation direction is twisted through an angle of almost 90° between two substrates. STN liquid-crystal cells are cells in which the orientation direction of the liquid-crystal molecules is twisted through an angle of no less than 90° (for example, about 180°~270°) between two substrates. Usually, TN liquid-crystal cells and STN liquid-crystal cells are provided with an initial orientation by tilting the liquid crystal molecules with respect to the substrate surface in order to improve display performance. The angle of such initial orientation is called a pretilt angle.

Because the display performance of liquid crystal cells changes depending upon the pretilt angle, it is necessary to detect the pretilt angle in order to design liquid-crystal cells and control the manufacturing process. Furthermore, the pretilt angle also should be determined when an orientation technology, which requires the initial orientation of liquid crystal molecules to be a desired pretilt angle, is developed or when the relationship between display performance and the pretilt angle of liquid crystal molecules is being studied.

A crystal rotation (CR) method is known as a method for detecting the pretilt angle (J. Appl. Phys., Vol. 48, No 1783, 1977). According to the crystal rotation method, a twist-free, horizontally-oriented liquid-crystal cell is disposed between a polarizer and an analyzer and the transmitted light intensity is measured while changing the incident angle of the incident light on the liquid-crystal cell. The pretilt angle is then calculated by using incident angles that correspond to a maximum or minimum intensity of the transmitted light. Methods for detecting the pretilt angle that have utilized the improved crystal rotation methods were disclosed in Japanese Laid-open Patent Application Nos. 8-94445 and 11-160198.

However, the crystal rotation method is basically a method for detecting a pretilt angle of a liquid-crystal cell in which the orientation direction is not twisted. Therefore, it is not suitable for detecting the pretilt angle of liquid-crystal cells having a twisted orientation direction, such as TN liquid-crystal cells and STN liquid-crystal cells.

Accordingly, several pretilt angle detection methods have been proposed that are suitable for detecting the pretilt angle of liquid-crystal cells having a twisted orientation direction.

Thus, Japanese Laid-open Patent Application No. 5-18860 disclosed a method for detecting a pretilt angle of a liquid-crystal cell by using a photoelastic modulation element (PEM) and analyzing the polarization state of the light outgoing from the liquid-crystal cell.

Japanese Laid-open Patent Application No. 6-74864 disclosed a method for measuring the intensity of light that has passed through a tilted liquid-crystal cell (transmitted light intensity) and determining the pretilt angle of the liquid-crystal cell based upon the inclination angle at which the transmitted light intensity reaches a maximum.

Japanese Laid-open Patent Application No. 9-152321 disclosed a method for measuring spectral characteristics of light that has passed through a tilted liquid-crystal cell (transmitted light intensity) and determining the pretilt angle of the liquid-crystal cell based upon the spectral characteristics of the transmitted light.

Japanese Laid-open Patent Application No. 11-352449 disclosed a method for measuring the transmitted light intensity in a liquid-crystal cell by using light having a plurality of wavelengths and determining the pretilt angle of the liquid-crystal cell based upon the measured intensity of the transmitted light.

The method disclosed in Japanese Laid-open Patent Application No. 5-18860 is based upon the assumption that the thickness d of the liquid crystal cell, the twist angle Φ of orientation between two substrates, and the refractive indexes $n_o$, $n_e$ of the liquid-crystal material with respect to ordinary and extraordinary light are known in advance. In the case of rod-like liquid crystal molecules, ordinary light is polarized in the direction perpendicular to the longitudinal axis of the liquid crystal molecule (electric flux density oscillates in this direction), and the extraordinary light is polarized in the direction perpendicular to the ordinary light (electric flux density oscillates in the direction perpendicular to the oscillation direction of the electric flux density for ordinary light). However, the thickness d of the liquid-crystal cell and the twist angle Φ of orientation are, in fact, not known in advance and should be measured separately. Moreover, even if those parameters are determined, the value obtained is different from the actual pretilt angle. Furthermore, an expensive photoelastic modulation element (PEM) is necessary for these measurements.

Japanese Laid-open Patent Application No. 6-74864 does not disclose a specific method for calculating a pretilt angle of a liquid crystal cell based upon the tilt angle of the liquid-crystal cell at which the transmitted light intensity reaches a maximum. By altering the tilt angle of the liquid-crystal cell, the transmitted light intensity changes. However, the transmitted light intensity greatly depends upon the thickness d of the liquid-crystal layer, the twist angle Φ of orientation between the substrates, the refractive indexes $n_o$, $n_e$ of the liquid-crystal material with respect to ordinary and extraordinary light, and the wavelength λ of the light utilized for the measurements. For this reason, the relationship between the pretilt angle and tilt angle of the liquid-crystal cell at which the transmitted light intensity reaches a maximum is not simple.

According to the method disclosed in Japanese Laid-open Patent Application No. 9-152321, the transmitted light intensity must be calculated using a 4×4 matrix method for polychromatic light each time that changes are made to the thickness d of the liquid-crystal layer, the twist angle Φ of orientation between the substrates, the refractive indexes $n_o$, $n_e$ of the liquid-crystal material with respect to ordinary and extraordinary light, and the wavelength λ of light utilized for the measurements. Therefore, the amount of calculations is enormous. Furthermore, because the measurements must be performed with polychromatic light, the light source and the photodetector become complex.

According to the method disclosed in Japanese Laid-open Patent Application No. 11-352449, the measurements must be performed using polychromatic light and the transmitted light intensity must be calculated using a 4×4 matrix method for the polychromatic light. Therefore, the same problems are encountered as those described with reference to the method disclosed in Japanese Laid-open Patent Application No. 9-152321. Furthermore, the specification of Japanese Laid-open Patent Application No. 11-352449 does not disclose a specific method for calculating the pretilt angle.

DISCLOSURE OF THE INVENTION

It is an object of the present invention to provide pretilt angle detecting methods and apparatus capable of determining a pretilt angle of an element, in which the orientation direction of molecules is twisted between the light incident side and light outgoing side, within a short time and in a simple manner by using a simple measurement apparatus.

In accordance with a first aspect of the present invention, the transmitted light intensity is measured by changing the light incident angle upon a sample having a twisted orientation and the pretilt angle of the sample having a twisted orientation is determined by analyzing the dependence of the transmitted light intensity on the light incident angle for a plurality of light incident angles.

In accordance with another aspect of the present invention, the light incident angle on a sample having a twisted orientation is changed, a plurality of transmitted light intensities is measured for each light incident angle, and the pretilt angle of the sample having a twisted orientation is determined by analyzing the dependence of the transmitted light intensity on the light incident angle for a plurality of light incident angles.

In accordance with the present invention, it is not necessary to use a plurality of lights having different wavelengths. Therefore, the pretilt angle can be determined within a short time by using a simple measurement apparatus.

In a preferred embodiment of the present invention, Stokes parameters for a plurality of light incident angles are determined based upon the transmitted light intensity measured for a plurality of light incident angles, and then the pretilt angle of the sample having a twisted orientation is determined based upon the Stokes parameters. When the pretilt angle is determined by using the Stokes parameters, a simpler measurement apparatus can be used and the measurement time can be further shortened.

In another preferred embodiment of the present invention, an apparent retardation for a plurality of light incident angles is determined based upon the measured transmitted light intensity for a plurality of light incident angles, and then the pretilt angle of the element is determined based upon the apparent retardation When the pretilt angle is determined by using the apparent retardation, complex simulation becomes unnecessary. Therefore, the amount of calculations is greatly reduced.

In still another preferred embodiment of the present invention, Stokes parameters for a plurality of light incident angles are determined based upon the measured transmitted light intensity for a plurality of light incident angles, the apparent retardation is determined based upon the Stokes parameters, and the pretilt angle of the element is determined based upon the apparent retardation. In this case, the average pretilt angle is determined based upon the apparent retardation and the pretilt angle can be determined based upon the average pretilt angle.

In still another preferred embodiment of the present invention, the transmitted light intensity is measured in a state in which the following relationship is satisfied between the orientation direction $\alpha^{in}$(rad) of molecules at the light incident side interface of the sample having a twisted orientation and the twist angle $\Phi$ (rad) of the element;

$$\tan\alpha^{in} = -\frac{\Phi - \sin\Phi}{1 - \cos\Phi}.$$

The pretilt angle can be determined accurately by measuring the transmitted light intensity in such arrangement.

The term "a plurality of optical clement arrangements" refers to a state in which the structural elements of an optical system or arrangement angles of structural elements differ, such as, e.g., in the case when a quarter-wave plate is inserted, and the analyzer is rotated through a prescribed angle.

The objects and advantages of the present invention can be more clearly understood from the description of the embodiments described below or the claims, as illustrated by the drawings.

PREFERRED EMBODIMENTS OF THE INVENTION

Figure 1:
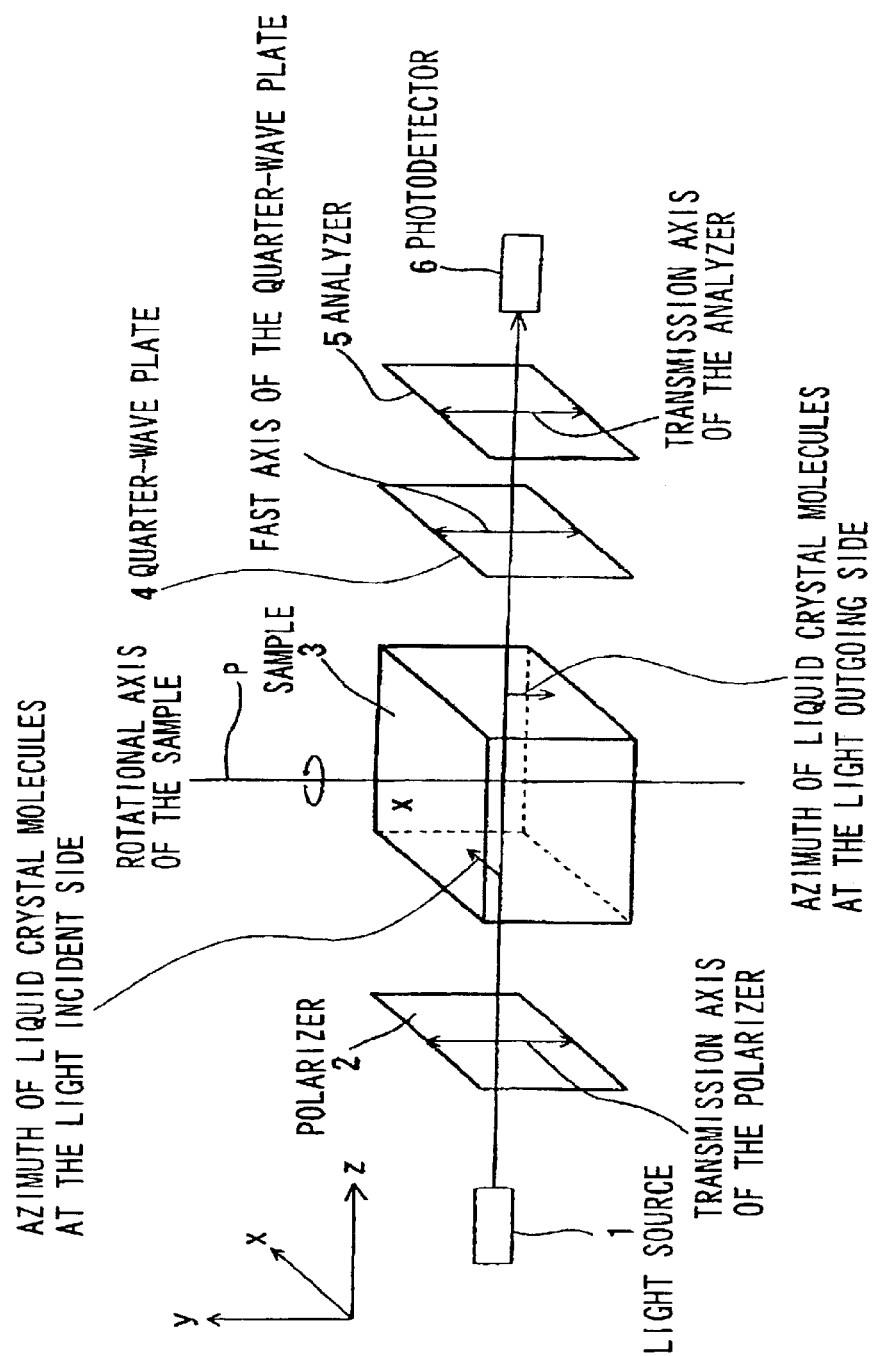
FIG. 1 illustrates an example of a measurement apparatus used in accordance with the present invention.

The preferred embodiments of the present invention will be described below.

In the present specification, a liquid-crystal cell will be described as an example of an element in which the direction of molecular orientation was twisted between the light incident side and light outgoing side. However, the present invention is also applicable to elements other than the liquid-crystal cells, for example, to films in which the twisted orientation state of liquid crystals is fixed by polymerization.

As described above, the display principle of liquid-crystal cells is based upon the fact that the orientation direction of liquid crystal molecules changes, thereby changing the polarization state of the outgoing light when a voltage is applied across the liquid-crystal cell. Conversely, the orientation state of liquid crystal molecules can be detected, in principle, by analyzing the polarization state of outgoing light.

The parameters describing the orientation state of a liquid-crystal cell, in which the direction of orientation of liquid crystal molecules are twisted between substrates, include the thickness d of the liquid-crystal layer (gap between the substrates), the twist angle Φ of the direction of orientation between the substrates, and the pretilt angle $\theta_s$, A description of the sample, in which the direction of orientation is not twisted, can be provided by assuming that in such sample Φ=0° and by including this case in consideration of samples having a twisted orientation.

In a sample having a twisted orientation, the orientation direction of liquid crystal molecules in the liquid-crystal layer gradually changes from one substrate to the other. In the case of a thin layer having a very small thickness, the orientation direction of liquid crystal molecules can be approximated as not changing within the thin layer.

Accordingly, if the liquid-crystal layer is divided into a large number of very thin layers, which are so thin that the orientation direction of liquid crystal molecules within the thin layers can be approximately considered to be a constant, then changes in the polarization state of light propagating through the liquid-crystal layer can be represented as a superposition of changes of polarization state of all thin layers.

Within the divided thin layer, the components $n_o'$ and $n_e'$ of the refractive index of the ordinary light and extraordinary light in the direction normal to the layer can be represented by [Equations 1]. In this case, $\theta_{LC}$ and $\phi_{LC}$ represent a tilt angle and an azimuth of the liquid crystal molecules within the thin layer. $n_o$ and $n_e$ represent refractive indexes of the liquid crystal with respect to ordinary light and extraordinary light, and θ represent the incident angle of the light The tilt angle $\theta_{LC}$ is the tilt angle of the liquid crystal molecules with respect to the substrate surface, i.e., an angle formed by a vector parallel to the liquid crystal molecule (referred to as a director) and a projection of the director onto the substrate surface. Furthermore, the azimuth $\phi_{LC}$ is an angle formed by projecting the director onto the substrate surface and a reference axis of the substrate surface.

$$n_e' = -\frac{\varepsilon_{xz}}{\varepsilon_{zz}}X + \sqrt{\frac{n_e^2 \cdot n_o^2}{\varepsilon_{zz}} - \frac{\varepsilon_{xx} \cdot \varepsilon_{zz} - \varepsilon_{xz}^2}{\varepsilon_{zz}^2}X^2}$$ [Equations 1]

$$n_o' = \sqrt{n_o^2 - X^2}$$

$$X = n \cdot \sin\theta$$

$$\varepsilon_{zz} = n_o^2 + (n_e^2 - n_o^2)\sin^2\theta_{LC}$$

$$\varepsilon_{xx} = n_o^2 + (n_e^2 - n_o^2)\cos^2\theta_{LC} \cdot \cos^2\phi_{LC}$$

$$\varepsilon_{xz} = (n_e^2 - n_o^2)\sin\theta_{LC} \cdot \cos\theta_{LC} \cdot \cos\phi_{LC}$$

In this case, n is a refractive index of the surrounding medium (e.g., air). θ is the incident angle of the light. $n'_o$ and $n'_e$ are components of the refractive index in the direction normal to the layer; $k_{i,z}$ is defined as $2\pi n'V/\lambda$ (i=o or e). $k_{i,z}$ is the component of the vector normal to the wave front of ordinary (i=o) or extraordinary light (i=e), and this component is normal to the layer. λ is the wavelength of the light.

When the incident light is perpendicular to the liquid-crystal cell, θ=0°. Therefore, [Equations 1] become [Equations 2].

$$n_e' = \frac{n_e \cdot n_o}{\sqrt{n_o^2 + (n_e^2 - n_o^2)\sin^2\theta_{LC}}}$$ [Equations 2]

$$n_o' = n_o$$

In this case, [Equations 2] do not depend on the azimuth $\phi_{LC}$ of liquid crystal molecules within the thin layer. Furthermore, the pretilt angle $\theta_s$ of the usual TN liquid-crystal cell is at most about 10° and, even in STN liquid-crystal cells, it is about 30°. Therefore, the tilt angle $\theta_{LC}$ of liquid crystal molecules within the thin layer is almost constant. As a result, it can be approximated that $\theta_{LC}=[\theta_{LC}]=$ constant. In this case, $[\theta_{LC}]$ is an average tilt angle. Furthermore, in case of normal incidence, it is typically assumed that $[\theta_{LC}]=\theta_s$. For this reason, the apparent retardation (phase delay) Δn'd of the liquid-crystal layer represented by [Equation 3] can be taken as a constant. Therefore, in the case of normal incident light, the phase difference δ, which occurs when the light passes through a sample having a twisted orientation, can be represented as a function of the apparent retardation Δn'd of the liquid-crystal layer represented by [Equation 3], the light wavelength λ, and the twist angle Φ of the orientation of the liquid-crystal layer.

$$\Delta n'd = [n_e' - n_o'] \cdot d = \left[\sqrt{\frac{n_e^2 \cdot n_o^2}{n_o^2 + (n_e^2 - n_o^2)\sin^2[\theta_{LC}]}} - n_o\right] \cdot d$$ [Equation 3]

Therefore, the polarization state of the outgoing light can be represented by the polarization state of the incident light, the wavelength λ of the incident light, the apparent retardation Δn'd of the liquid-crystal layer, and the twist angle Φ of the orientation of the liquid-crystal layer. In other words, the apparent retardation Δn'd of the liquid-crystal layer can be determined from the polarization state of the outgoing light in a normal incident state of light. However, the thickness d of the liquid crystal layer and $[\theta_{LC}]$ cannot be independently determined from the apparent retardation Δn'd thus found. In order to determine $[\theta_{LC}]$ from the apparent retardation Δn'd, it is necessary to know in advance the thickness d of the liquid-crystal layer, as in the pretilt detection method disclosed in Japanese Laid-open Patent Application No. 5-18860.

For this purpose, in the conventional pretilt angle detection methods, the transmitted light intensity was measured by using a plurality of lights having different wavelengths. However, such methods for measuring the intensity of transmitted light by using a plurality of lights requires the preparation of light sources or photodetectors and optical elements which correspond to each wavelength. Further, calibration of the light output of the light sources and detection efficiency of photodetectors should be performed for each wavelength. Furthermore, the measurement time is long. Moreover, when samples having color filters attached thereto are measured, there is a possibility that different pixels will be measured if the wavelength is different. Because the pixel thickness of color filters differs, the thickness d of the liquid-crystal layer also differs in the pixels. For this reason, the reliability of the measurement results is lost.

In accordance with the present invention, the incident angle θ of the incident light on a sample having a twisted orientation, such as a liquid-crystal cell, is changed and the quantities depending on the light incident angles θ are measured for a plurality of (at least two) light incident angles. For example, the transmitted light intensity or transmissivity can be used as such quantity. In the present specification, the expression "transmitted light intensity" is intended to mean the measured value representing the intensity of light detected with a photodetector, including the transmissivity. The pretilt angle $\theta_s$ and the thickness d are independently determined based upon the measured quantities.

More specifically, the pretilt angle $\theta_s$ and sample thickness (gap) d are determined by comparing the measured transmitted light intensity corresponding to each light incident angle $\theta$ with calculated data obtained by simulation. In the alternative, the pretilt angle $\theta_s$ and sample thickness (gap) d are determined by comparing the measured transmitted light intensity corresponding to the light incident angles $\theta$ or the quantities calculated from the intensity of transmitted light, e.g., Stokes parameters or apparent retardation, with theoretical formulas.

Because methods in accordance with the present invention, in principle, do not require the utilization of a plurality of lights having different wavelengths, the light source and photodetector system can have a simple configuration. Furthermore, it is also not necessary to take into account effects resulting from the utilization of a plurality of lights having different wavelengths.

The preferred embodiments of the present invention will be described below.

First Embodiment

An "extended Jones matrix method" or a "4×4 matrix method" can be used for the simulation. Accuracy can be increased by incorporating information about structural components, such as transparent electrodes or oriented films, into the simulation. The "4×4 matrix method" requires more computation that the "extended Jones matrix method." However, in accordance with the present invention, computation may be performed for a single wavelength. Therefore, the amount of computation may be reduced by comparison with multiple-wavelength computations using the "4×4 matrix method." For this reason, accuracy can be increased by changing the simulation method, even when samples are considered that have a large pretilt angle $\theta_s$, thereby making it impossible to approximate the tilt angle $\theta_{LC}$ by a constant, or when the pretilt angles $\theta_s$ are different at the upper and lower boundaries.

In the present embodiment, a case will be considered in which the "4×4 matrix method" was used.

Propagation of light is described by Maxwell's equations. When a sample is electrically neutral and the electric resistance is sufficiently large, Maxwell's equations at any point in the sample can be represented by [Equation 4]. In this case, $E_x$, $E_y$, $E_z$ are the components of an electric field vector. $D_x$, $D_y$, $D_z$ are the components of an electric flux density vector. $H_x$, $H_y$, $H_z$ are the components of a magnetic field vector. $B_x$, $B_y$, $B_z$ are the components of a magnetic flux density vector. $\varepsilon_{xx} \sim \varepsilon_{zz}$ are the components of a dielectric constant tensor represented by [Equations 5]. $\mu$ is magnetic permeability.

$$\begin{pmatrix} 0 & 0 & 0 & 0 & -\frac{\partial}{\partial z} & \frac{\partial}{\partial y} \\ 0 & 0 & 0 & \frac{\partial}{\partial z} & 0 & -\frac{\partial}{\partial x} \\ 0 & 0 & 0 & -\frac{\partial}{\partial y} & \frac{\partial}{\partial x} & 0 \\ 0 & \frac{\partial}{\partial z} & -\frac{\partial}{\partial y} & 0 & 0 & 0 \\ -\frac{\partial}{\partial z} & 0 & \frac{\partial}{\partial x} & 0 & 0 & 0 \\ \frac{\partial}{\partial y} & -\frac{\partial}{\partial x} & 0 & 0 & 0 & 0 \end{pmatrix} \begin{pmatrix} E_x \\ E_y \\ E_z \\ H_x \\ H_y \\ H_z \end{pmatrix} = \quad \text{[Equation 4]}$$

$$\frac{\partial}{\partial t} \begin{pmatrix} D_x \\ D_y \\ D_z \\ B_x \\ B_y \\ B_z \end{pmatrix} = \frac{\partial}{\partial t} \begin{pmatrix} \varepsilon_{xx} & \varepsilon_{xy} & \varepsilon_{xz} & 0 & 0 & 0 \\ \varepsilon_{yx} & \varepsilon_{yy} & \varepsilon_{yz} & 0 & 0 & 0 \\ \varepsilon_{zx} & \varepsilon_{zy} & \varepsilon_{zz} & 0 & 0 & 0 \\ 0 & 0 & 0 & \mu & 0 & 0 \\ 0 & 0 & 0 & 0 & \mu & 0 \\ 0 & 0 & 0 & 0 & 0 & \mu \end{pmatrix} \begin{pmatrix} E_x \\ E_y \\ E_z \\ H_x \\ H_y \\ H_z \end{pmatrix}$$

$$\langle \varepsilon \rangle = \begin{pmatrix} \varepsilon_{xx} & \varepsilon_{xy} & \varepsilon_{xz} \\ \varepsilon_{yx} & \varepsilon_{yy} & \varepsilon_{yz} \\ \varepsilon_{zx} & \varepsilon_{zy} & \varepsilon_{zz} \end{pmatrix} \quad \text{[Equations 5]}$$

$$\varepsilon_{xx} = n_o^2 + (n_e^2 - n_o^2)\cos^2\theta_{LC} \cdot \cos^2\phi_{LC}$$
$$\varepsilon_{xy} = (n_e^2 - n_o^2)\cos^2\theta_{LC} \cdot \sin\phi_{LC} \cdot \cos\phi_{LC}$$
$$\varepsilon_{xz} = (n_e^2 - n_o^2)\sin\theta_{LC} \cdot \cos\theta_{LC} \cdot \cos\phi_{LC}$$
$$\varepsilon_{yx} = (n_e^2 - n_o^2)\cos^2\theta_{LC} \cdot \sin\phi_{LC} \cdot \cos\phi_{LC}$$
$$\varepsilon_{yy} = n_o^2 + (n_e^2 - n_o^2)\cos^2\theta_{LC} \cdot \sin^2\phi_{LC}$$
$$\varepsilon_{yz} = (n_e^2 - n_o^2)\sin\theta_{LC} \cdot \cos\theta_{LC} \cdot \sin\phi_{LC}$$
$$\varepsilon_{zx} = (n_e^2 - n_o^2)\sin\theta_{LC} \cdot \cos\theta_{LC} \cdot \cos\phi_{LC}$$
$$\varepsilon_{zy} = (n_e^2 - n_o^2)\sin\theta_{LC} \cdot \cos\theta_{LC} \cdot \sin\phi_{LC}$$
$$\varepsilon_{zz} = n_e^2 + (n_e^2 - n_o^2)\sin^2\theta_{LC}$$

In this case, $n_o$ and $n_e$ are the refractive indexes of ordinary light and extraordinary light. $\theta_{LC}$ and $\phi_{LC}$ are the tilt angle and azimuth of a molecule at a point under consideration. $\theta$ is a light incident angle. Brackets < > provided at both sides of a symbol will herein represent a tensor or matrix. If the point under consideration is within the liquid-crystal layer, the parameters of the liquid crystal are used as the above-described parameters. Furthermore, in the case of an isotropic medium, $n_o = n_e$, and $\theta_{LC} = \phi_{LC} = 0°$.

If an approximation is used such that the tilt angle in the liquid-crystal layer is considered to be a constant, then $\theta_{LC} = [\theta_{LC}]$. Generally, it is most often considered that $[\theta_{LC}] = \theta_s$. $[\theta_{LC}]$ is a parameter having a positive correlation with pretilt angle $\theta_s$ and coincides with the average tilt angle in the case of normal incidence. However, it is not exactly equal to pretilt angle $\theta_s$. If the pretilt angle $\theta_s$ is determined with higher accuracy, then the distribution of the tilt angle $\theta_{LC}$ in the liquid-crystal layer can be determined by orientation simulation.

When monochromatic light having an angular frequency $\omega$ is incident from an isotropic medium with a refractive index n, and propagates over an XZ plane from the negative direction of the Z axis to the positive direction thereof, and if the dielectric constant tensor <$\varepsilon$> in the XZ plane is assumed to be constant, then [Equation 4] can be replaced with [Equations 6]. In this case, i is an imaginary number unit, and $\theta$ is a light incident angle.

[Equations 6]

$$\frac{\partial}{\partial Z}\underline{\Psi} = i\omega\langle\Delta\rangle\underline{\Psi} =$$

$$i\omega\begin{pmatrix} -\frac{\xi}{\omega}\frac{\varepsilon_{xz}}{\varepsilon_{zz}} & \mu - \left[\frac{\xi}{\omega}\right]^2\frac{1}{\varepsilon_{zz}} & -\frac{\xi}{\omega}\frac{\varepsilon_{yz}}{\varepsilon_{zz}} & 0 \\ \varepsilon_{xx} - \frac{\varepsilon_{xz}^2}{\varepsilon_{zz}} & -\frac{\xi}{\omega}\frac{\varepsilon_{xz}}{\varepsilon_{zz}} & \varepsilon_{xy} - \frac{\varepsilon_{xz}\cdot\varepsilon_{yz}}{\varepsilon_{zz}} & 0 \\ 0 & 0 & 0 & \mu \\ \varepsilon_{xy} - \frac{\varepsilon_{xz}\cdot\varepsilon_{yz}}{\varepsilon_{zz}} & -\frac{\xi}{\omega}\frac{\varepsilon_{yz}}{\varepsilon_{zz}} & \varepsilon_{yy} - \frac{\varepsilon_{yz}^2}{\varepsilon_{zz}} - \left[\frac{\xi}{\omega}\right]^2\frac{1}{\mu} & 0 \end{pmatrix}\underline{\Psi}$$

$$\frac{\partial}{\partial Z}\underline{\Psi} = i\omega\langle\Delta\rangle\underline{\Psi} =$$

$$i\omega\begin{pmatrix} -\frac{\xi}{\omega}\frac{\varepsilon_{xz}}{\varepsilon_{zz}} & \mu - \left[\frac{\xi}{\omega}\right]^2\frac{1}{\varepsilon_{zz}} & -\frac{\xi}{\omega}\frac{\varepsilon_{yz}}{\varepsilon_{zz}} & 0 \\ \varepsilon_{xx} - \frac{\varepsilon_{xz}^2}{\varepsilon_{zz}} & -\frac{\xi}{\omega}\frac{\varepsilon_{xz}}{\varepsilon_{zz}} & \varepsilon_{xy} - \frac{\varepsilon_{xz}\cdot\varepsilon_{yz}}{\varepsilon_{zz}} & 0 \\ 0 & 0 & 0 & \mu \\ \varepsilon_{xy} - \frac{\varepsilon_{xz}\cdot\varepsilon_{yz}}{\varepsilon_{zz}} & -\frac{\xi}{\omega}\frac{\varepsilon_{yz}}{\varepsilon_{zz}} & \varepsilon_{yy} - \frac{\varepsilon_{yz}^2}{\varepsilon_{zz}} - \left[\frac{\xi}{\omega}\right]^2\frac{1}{\mu} & 0 \end{pmatrix}\underline{\Psi}$$

$$\underline{\Psi} = \begin{pmatrix} E_x \\ H_y \\ E_y \\ -H_x \end{pmatrix}$$

$$\frac{\xi}{\omega} = \frac{n\cdot\sin\theta}{c}$$

$$E_z = -\frac{\varepsilon_{zx}\cdot E_x + \varepsilon_{zy}\cdot E_x + \frac{\xi}{\omega}H_y}{\varepsilon_{zz}}$$

$$H_z = \frac{\xi}{\omega\cdot\mu}E_y$$

Underlined symbols hereinbelow represent vectors.

Within a small zone having width h, such that <Δ> can be considered to be a constant, [Equation 6] can be integrated. The integrated [Equation 6] can be represented by [Equation 7].

$$\underline{\Psi}(z+h) = \exp(i\omega h\langle\Delta\rangle)\underline{\Psi}(z) = \langle P(z,h)\rangle\underline{\Psi}(z) \qquad \text{[Equation 7]}$$

<P> is called a local propagation matrix.

If the operation is repeated for n divided zones, [Equation 8] is obtained.

$$\underline{\Psi}(z+s) = \langle P_n\rangle\langle P_{n-1}\rangle\ldots\langle P_2\rangle\langle P_1\rangle\underline{\Psi}(z) \qquad \text{[Equation 8]}$$

$$= \langle P_{out}\rangle\langle P_{LC}\rangle\langle P_{in}\rangle\underline{\Psi}(z)$$

$$= \langle F(z,s)\rangle\underline{\Psi}(z)$$

<F> is called a propagation matrix. Furthermore, <$P_{out}$> and <$P_{in}$> are local propagation matrixes of the optical element, e.g., a substrate, at the light outgoing side and light incident side. <$P_{LC}$> is a local propagation matrix of the liquid-crystal layer. s is the total length of the light propagation.

The state of the outgoing light that has propagated a distance s can be found by solving [Equation 8] with respect to the polarization of the incident light and using [Equation 6]. More specifically, s is the sum of the liquid-crystal layer thickness d and the thickness of the optical element at the light outgoing side and light incident side, which were taken into account when computing the propagation matrix.

The intensity I of light that was transmitted through the sample is a function of the pretilt angle $\theta_s$, the thickness (gap) d of the liquid crystal layer, and the light incident angle θ. The transmitted light intensity I can be represented as [Equation 9] by using components $E_x(z+s)$, $E_y(z+s)$, $E_z(z+s)$ of the electric field vector of outgoing light.

$$I(\theta_s,d,\theta) = |E_x(z+s)|^2 + |E_y(z+s)|^2 + |E_z(z+s)|^2 \qquad \text{[Equation 9]}$$

In the present embodiment, the pretilt angle $\theta_s$ of the sample is determined in the following manner.

The first method is a method for determining in advance the relationship between the pretilt angle $\theta_s$ and transmitted light intensity I.

According to the first method, the transmitted light intensity I corresponding to an optical system arrangement (a combination of locations of optical elements, such as a polarizer, an analyzer, etc.) in one or a plurality of combinations having a plurality of light incident angles θ is calculated in advance by using [Equations 4]–[Equation 9] with respect to various combinations of pretilt angle $\theta_s$ and thickness d of the liquid-crystal layer.

The transmitted light intensity I is then measured for each light incident angle θ, while changing the light incident angle θ. Then, the combinations of transmitted light intensity I for each light incident angle θ for various combinations of pretilt angles $\theta_s$ and the thickness d of the liquid-crystal layer that were calculated in advance are searched to find the closest to the combination of measured transmitted light intensity I for each light incident angle θ.

The pretilt angle of the sample thus determined is the pretilt angle $\theta_s$ corresponding to the combination that has been found.

According to the second method, the combinations of pretilt angle $\theta_s$ and thickness d of liquid-crystal layer are successively substituted into [Equations 4]–[Equation 9] until the transmitted light intensity I calculated for each light incident angle θ almost coincides with the transmitted light intensity I measured for each light incident angle θ.

According to the second method, the transmitted light intensity I of the sample is measured for each light incident angle θ while changing the light incident angle θ.

Then, [Equations 4]–[Equation 9] are used and the transmitted light intensity I for each light incident angle θ is calculated under the assumption that the pretilt angle $\theta_s$ of the sample and the liquid-crystal layer thickness d are the appropriate values. The pretilt angle $\theta_s$ of the sample and the liquid-crystal layer thickness d are then changed until the transmitted light intensity I calculated for each light incident angle θ almost coincides with the transmitted light intensity I measured for each light incident angle θ.

The pretilt angle $\theta_s$ of the sample is determined from the combination of pretilt angle $\theta_s$ and the liquid-crystal thickness d at the time when the transmitted light intensity I calculated for each light incident angle θ almost coincided with the transmitted light intensity I calculated for each light incident angle θ.

In the above-described two methods, only the pretilt angle $\theta_s$ and thickness d are changed. Therefore, other parameters, e.g., the twist angle Φ, must be known in advance. However, even when other parameters are not known, the unknown parameters can also be determined by modifying the methods so that, in addition to the pretilt angle $\theta_s$ and thickness d, the unknown parameters are also changed.

Furthermore, in the above described two methods, the calculated values of the transmitted light intensity I were compared with the measured ones. However, other quantities, e.g., Stokes parameters, calculated from the transmitted light intensity I may also be compared. A method for measuring and calculating the Stokes parameters will be described hereinbelow.

By approximating the tilt angle in the liquid-crystal layer as a constant, the pretilt angle obtained using the two above-described methods is $[\theta_{LC}]$. $[\theta_{LC}]$ is a quantity having a positive correlation with the pretilt angle $\theta_s$ and coincides with the average tilt angle in the case of normal incidence. However, strictly speaking, it does not coincide with the pretilt angle $\theta_s$. If the absolute value of pretilt angle $\theta_s$ is not necessarily required, e.g., in display production control, only variations of pretilt angle $\theta_s$ may be determined. In such a case, $[\theta_{LC}]$ may be readily utilized as the pretilt angle. Furthermore, the pretilt angle $\theta_s$ also may be determined from $[\theta_{LC}]$ by plotting the calibration curve Of $[\theta_{LC}]$ and pretilt angle $\theta_s$ obtained by conducting measurements on a sample having a known pretilt angle $\theta_s$ and then using the calibration curve for the determination. Furthermore, the pretilt angle $\theta_s$ may also be calculated from $[\theta_{LC}]$ by using the relationship between $[\theta_{LC}]$ and pretilt angle $\theta_s$, which is described in greater detail in the fourth embodiment.

When the pretilt angle $\theta_s$ itself is used as a parameter for calculating the transmitted light intensity I, as in the case when orientation simulation is utilized, the pretilt angle $\theta_s$ itself can be determined using the two above-described methods. Therefore, pretilt angle $\theta_s$ can be determined with higher accuracy.

Second Embodiment

The second embodiment of the present invention will be described below. In the second embodiment, the pretilt angle is determined by using Stokes parameters.

A method using Stokes parameters has been known as a method for representing the polarization state of light. The Stokes parameters of liquid-crystal cells can be calculated by using the transmitted light intensity measured in a state in which a quarter-wave plate or polarizer is disposed at the light incident side and light outgoing side of the liquid-crystal cell. This procedure is therefore very simple. A method for detecting the Stokes parameters is disclosed, for example, in Principles of Optics (M. Born, E. Wolf. Translated into Japanese by Kusagawa and Yokoda. Published by Tokai Daigaku Shuppankai) or Japanese Patent No. 3023443.

A method for detecting Stokes parameters will be described below.

For example, a measurement apparatus shown in FIG. 1 can be used for measuring the transmitted light intensity necessary in order to calculate the Stokes parameters $S_0$, $S_1$, $S_2$, $S_3$ of a liquid-crystal cell. In the measurement apparatus shown in FIG. 1, a light source 1, a polarizer 2, a sample 3 having a twisted orientation (e.g., a liquid-crystal cell) 3, a quarter-wave plate 4, an analyzer 5, and a photodetector 6, such as a photodiode or CCD camera, are arranged in an X-Y-Z system of coordinates having orthogonal axes X, Y, and Z.

The light source 1 emits light along the Z axis. The polarizer 2 is disposed parallel to the X-Y plane, which is perpendicular to the Z axis, and the transmission axis (polarization axis) thereof is set in the Y axis direction. The analyzer 5 is disposed parallel to the X-Y plane and the transmission axis (polarization axis) thereof can be set along the X axis direction and Y axis direction and at an angle of 45° with respect to the X and Y axes. The quarter-wave plate 4 is disposed so that it can be inserted between the sample 3 and the analyzer 5 in a state in which the fast axis thereof is oriented along the Y axis direction. With respect to the refractive index main axes, a refractive index main axis for which the main refractive index in the direction of the refractive index main axis is less than the main refractive index in the direction of other refractive index main axes is referred to as a fast axis. Furthermore, the quarter-wave plate 4 is disposed so that the fast axis thereof can be set along the Y axis direction, X axis direction, and at an angle of 45° with respect to the X and Y axes. The sample 3 is set in a sample rotating mechanism having a rotational axis P, which crosses the light beam emitted from the light source 1 and is parallel to the Y axis, so that the normal thereto is parallel to the Z axis.

A white-light source, such as a halogen lamp, can be used as the light source 1. When a white-light source is used as the light source 1, a color filter for converting the light emitted from the light source 1 into monochromatic light is inserted between the light source 1 and the polarizer 2. Furthermore, a laser can also be used as the light source.

A processing device (not shown in the figures) is provided to calculate the Stokes parameters of the transmitted light, the pretilt angle $\theta_s$ of the sample 3, and the thickness d of the liquid-crystal layer based upon the output signals of the photodetector 6 and to output the calculation results to a display screen or a printer.

The polarizer 2, the analyzer 5, the quarter-wave plate 4, and the sample 3 may be rotated and inserted manually or using a drive means, such as a motor. Furthermore, detection means for detecting the rotation angle of the sample 3 (light incident angle) is preferably provided and detection signals from the detection means are preferably input into the processing device.

Measurements of the transmitted light intensity necessary to calculate the Stokes parameters $S_0$~$S_3$ of sample 3 using the above-described measurement device are performed, for example, in the following manner. The sample 3 is rotated through an appropriate light incident angle $\theta$.

First, the transmission axis of the analyzer 5 disposed between the sample 3 and the photodetector 6 is oriented along the X axis direction. Then, the quarter-wave plate 4 is removed from the measurement system. In the alternative, the fast axis of the quarter-wave plate 4 is oriented parallel or perpendicular to the transmission axis of the analyzer 5. The output signal of the photodetector 6 at this time is considered to be a transmitted light intensity $I_x(\theta)$ corresponding to the light incident angle $\theta$.

The transmission axis of the analyzer 5 is then oriented along the Y axis direction. Then, the quarter-wave plate 4 is removed from the measurement system. In the alternative, the fast axis of the quarter-wave plate 4 is oriented parallel or perpendicular to the transmission axis of the analyzer 5. The output signals of the photodetector 6 at this time are considered to be a transmitted light intensity $I_y(\theta)$ corresponding to the light incident angle $\theta$.

The transmission axis of the analyzer 5 is then oriented at an angle of 45° to the X and Y axes. Then, the quarter-wave plate 4 is removed from the measurement system. In the alternative, the fast axis of the quarter-wave plate 4 is oriented parallel or perpendicular to the transmission axis of the analyzer 5. The output signals of the photodetector 6 at this time are considered to be a transmitted light intensity $I_{xy}(\theta)$ corresponding to the light incident angle $\theta$.

Then, the quarter-wave plate 4 is disposed between the sample 3 and the analyzer 5 so that the fast axis thereof is oriented in the Y axis direction, in a state in which the transmission axis of the analyzer 5 has been oriented at an angle of 45° with respect to the X and Y axes. The output signals of photodetector 6 at this time are considered to be a transmitted light intensity $I_{qxy}(\theta)$ corresponding to the light incident angle $\theta$.

The transmitted light intensities $I_x(\theta)$, $I_y(\theta)$, $I_{xy}(\theta)$, and $I_{qxy}(\theta)$ corresponding to the light incident angle $\theta$ that were measured in the above-described manner have the relationships represented by [Equations 10] with the Stokes parameters $S_0(\theta)$, $S_1(\theta)$, $S_2(\theta)$, and $S_3(\theta)$ corresponding to the light incident angle $\theta$.

$$S_0(\theta) = I_x(\theta) + I_y(\theta)$$

$$S_1(\theta) = I_x(\theta) - I_y(\theta)$$

$$S_2(\theta) = 2 \cdot I_{xy}(\theta) - [I_x(\theta) + I_y(\theta)]$$

$$S_3(\theta) = [I_x(\theta) + I_y(\theta)] - 2 \cdot I_{qxy}(\theta) \quad \text{[Equations 10]}$$

In a state of complete polarization, Stokes parameters $S_0(\theta) \sim S_3(\theta)$ will satisfy the relationship represented by [Equation 11].

$$S_0(\theta)^2 = S_1(\theta)^2 + S_2(\theta)^2 + S_3(\theta)^2 \quad \text{[Equation 11]}$$

In a state of complete polarization, it is sufficient to know three of the Stokes parameters $S_0(\theta) \sim S_3(\theta)$. Therefore, when calculations are performed based upon the measured values, it is not necessary to calculate all four Stokes parameters $S_0(\theta) \sim S_3(\theta)$, even when the theoretical calculation is performed by using [Equations 4]~[Equation 9]. As a result, the calculations can be simplified.

Furthermore, if the loss of light intensity caused by reflection or scattering and absorption is ignored, then $S_0(\theta)$ becomes a constant that matches the incident light intensity and does not depend upon $\theta$. This constant $S_0(\theta)$ can be determined from the measured values of $I_x(\theta)$ and $I_y(\theta)$. In this case, it is sufficient to determine only two of $S_1(\theta)$, $S_2(\theta)$, $S_3(\theta)$ from [Equation 11]. Therefore, the calculations can be further simplified. Moreover, in this case, measurement of the transmitted light intensity, e.g., transmitted light intensity $I_{qxy}(\theta)$, can be omitted. If the measurement of transmitted light intensity $I_{qxy}(\theta)$ can be omitted, the quarter-wave plate becomes unnecessary, the optical system can be simplified, and the measurement time can be shortened.

A complete polarization state is difficult to implement. However, for practical purposes, it is sufficient to use a polarizer and an analyzer having a quenching ratio of no less than 1000:1, and preferably no less than 5000:1.

A method for theoretically calculating Stokes parameter will be described below.

In the system of coordinates X-Y-Z shown in FIG. 1, light propagates along the Z axis direction. For this reason, the electric field vector $E(\theta)$ of light that passed through the sample 3 having a twisted orientation can be represented by a vector with two components in the X axis direction and Y axis direction (such vector is called a Jones vector). Furthermore, in most samples having a twisted orientation, the anisotropy $|n_e - n_o|$ of the refractive index is less than the refractive index itself. Under this assumption, the electric field vector $E(\theta)$ of the light that passed through sample 3 can be represented by [Equation 12] by using the electric field vector $\underline{E}^{in}$ to describe the polarization state of incident light.

$$E(\theta) = \begin{pmatrix} E_x(\theta) \\ E_y(\theta) \end{pmatrix} = \langle T_{out}(\theta) \rangle \cdot \langle R^{out} \rangle \cdot \langle J(\theta) \rangle \cdot \langle R^{in} \rangle \cdot \langle T^{in}(\theta) \rangle \cdot \underline{E}^{in} \quad \text{[Equation 12]}$$

In this case, $\langle R^{in} \rangle$, $\langle R^{out} \rangle$ are rotation matrixes represented by [Equations 13].

$$\langle R^{in} \rangle = \begin{pmatrix} \cos\alpha^{in} & \sin\alpha^{in} \\ -\sin\alpha^{in} & \cos\alpha^{in} \end{pmatrix}$$

$$\langle R^{out} \rangle = \begin{pmatrix} \cos\alpha^{in} & -\sin\alpha^{in} \\ \sin\alpha^{in} & \cos\alpha^{in} \end{pmatrix} \quad \text{[Equations 13]}$$

Furthermore, $\alpha^{in}$ is an azimuth of liquid crystal molecules at the light incident side interface in the system of coordinates X-Y-Z. Thus, $\alpha^{in}$ is an angle (azimuth of molecules at the light incident side) formed by the X axis and the director (orientation direction) of the liquid crystal molecule at the light incident side when the sample 3 is disposed parallel to the X-Y plane.

Furthermore, $\langle T^{in}(\theta) \rangle$, $\langle T^{out}(\theta) \rangle$ are matrixes representing anisotropy of transmissivity caused by the direction of light polarization at an air—glass interface and a glass—liquid crystal interface.

[Equations 14]

$$\langle T^{in}(\theta) \rangle = \begin{pmatrix} t_p & 0 \\ 0 & t_s \end{pmatrix}$$

$$t_p = \frac{2 \cdot \cos\theta}{\cos\theta_g^{in} + n_g^{in} \cdot \cos\theta} \cdot \frac{2 \cdot n_g^{in} \cdot \cos\theta_g^{in}}{n_g^{in} \cdot \cos\theta_0 + n_0 \cdot \cos\theta_g^{in}}$$

$$t_s = \frac{2 \cdot \cos\theta}{\cos\theta + n_g^{in} \cdot \cos\theta_g^{in}} \cdot \frac{2 \cdot n_g^{in} \cdot \cos\theta_g^{in}}{n_g^{in} \cdot \cos\theta_g^{in} + n_0 \cdot \cos\theta_0}$$

$$\langle T^{out}(\theta) \rangle = \begin{pmatrix} t'_p & 0 \\ 0 & t'_s \end{pmatrix}$$

$$t'_p = \frac{2 \cdot n_0 \cdot \cos\theta_0}{n_0 \cdot \cos\theta_g^{out} + n_g^{out} \cdot \cos\theta_0} \cdot \frac{2 \cdot n_g \cdot \cos\theta_g^{out}}{n_g^{out} \cdot \cos\theta + \cos\theta_g^{out}}$$

$$t'_s = \frac{2 \cdot n_0 \cdot \cos\theta_0}{n_0 \cdot \cos\theta_0 + n_g^{out} \cdot \cos\theta_g^{out}} \cdot \frac{2 \cdot n_g^{out} \cdot \cos\theta_g^{out}}{n_g^{out} \cdot \cos\theta_g^{out} + \cos\theta}$$

$$n \cdot \sin\theta = n_g^{in} \cdot \sin\theta_g^{in} = n_0 \cdot \sin\theta_0 = n_g^{out} \cdot \sin\theta_g^{out}$$

$n_g^{in}$ and $n_g^{out}$ are refractive indexes of the substrate at the light incident side and light outgoing side, respectively. $\theta_g$ and $\theta_o$ are refractive indexes in the glass substrate and liquid-crystal layer. n is a refractive index of the surrounding isotropic medium, e.g., air. When no substrate is used, the refractive index of the surrounding medium is used. Indexes [$^{in}$] and [$^{out}$] indicate the light incident side and light outgoing side. $\langle J(\theta) \rangle$ can be formally represented by [Equations 15].

$$\langle J(\theta) \rangle = \begin{pmatrix} a & b \\ -b^* & a^* \end{pmatrix} \quad \text{[Equation 15]}$$

$$a = \frac{1}{x}\sin\Phi \cdot \sin(x\Phi) + \cos\Phi \cdot \cos(x\Phi) + i\frac{u}{x}\cos\Phi \cdot \sin(x\Phi)$$

$$b = \frac{1}{x}\cos\Phi \cdot \sin(x\Phi) - \sin\Phi \cdot \cos(x\Phi) + i\frac{u}{x}\sin\Phi \cdot \sin(x\Phi)$$

$$x = \sqrt{1+u^2} \quad u = \frac{\pi \Delta n'(\theta) d}{\lambda \Phi}$$

Furthermore, index * represents a conjugated complex number (a complex number with an inverted sign of an imaginary portion). $\Phi$ is the twist angle of orientation. $\Delta n'(\theta)d$ is the apparent retardation of the liquid-crystal layer. d is the thickness (gap) of the liquid-crystal layer.

The apparent retardation $\Delta n'(\theta)d$ of a liquid-crystal layer can be approximately represented by [Equations 16].

$$\Delta n'(\theta)d = \left(\overline{n'_e(\theta)} - \overline{n'_o(\theta)}\right) \cdot d \quad \text{[Equations 16]}$$

$$\overline{n'_e(\theta)} = -\frac{\overline{\varepsilon_{xz}}}{\overline{\varepsilon_{zz}}} \cdot X + \sqrt{\frac{n_e^2 \cdot n_o^2}{\overline{\varepsilon_{zz}}} - \frac{\overline{\varepsilon_{xx}} \cdot \overline{\varepsilon_{zz}} - \overline{\varepsilon_{xz}^2}}{\overline{\varepsilon_{zz}^2}} X^2}$$

$$\overline{n'_o(\theta)} = \sqrt{n_o^2 - X^2}$$

$$X = n \cdot \sin\theta$$

$$\overline{\varepsilon_{zz}} = n_o^2 + (n_e^2 - n_o^2)\sin^2[\theta_{LC}]$$

$$\overline{\varepsilon_{xx}} = n_o^2 + (n_e^2 - n_o^2)\cos^2[\theta_{LC}] \cdot \overline{\cos^2\phi_{LC}}$$

$$\overline{\varepsilon_{xz}} = (n_e^2 - n_o^2)\sin[\theta_{LC}] \cdot \cos\overline{\theta_{LC}} \cdot \overline{\cos\phi_{LC}}$$

$$\overline{\cos^2\phi_{LC}} = \frac{1}{\Phi}\int_{\alpha^{in}}^{\Phi+\alpha^{in}} \cos^2\varphi \, d\varphi$$

$$\overline{\cos\phi_{LC}} = \frac{1}{\Phi}\int_{\alpha^{in}}^{\Phi+\alpha^{in}} \cos\varphi \, d\varphi$$

In this case, the tilt angle $\theta_{LC}$ of a liquid crystal molecule was approximated as being equal to a certain constant value $[\theta_{LC}]$.

If [Equations 13]~[Equations 16] are substituted into [Equation 12], then [Equation 12] can be represented as [Equation 17].

$$\underline{E(\theta)} = \begin{pmatrix} E_x(\theta) \\ E_y(\theta) \end{pmatrix} = \begin{pmatrix} A_x(\theta)e^{i\delta x(\theta)} \\ A_y(\theta)e^{i\delta y(\theta)} \end{pmatrix} \quad \text{[Equation 17]}$$

$A_x(\theta)$ and $A_y(\theta)$ are amplitude components of the electric field vector. $\delta_x(\theta)$ and $\delta_y(\theta)$ are phase components of the electric field vector.

When the electric field vector of the outgoing light is represented by [Equation 17], the Stokes parameters $S_o(\theta)$~$S_3(\theta)$ can be represented by [Equations 18] by using $A_x(\theta)$, $A_y(\theta)$, $\delta_x(\theta)$, and $\delta_y(\theta)$.

$$S_0(\theta) = A_x^2(\theta) + A_y^2(\theta)$$

$$S_1(\theta) = A_x^2(\theta) - A_y^2(\theta)$$

$$S_2(\theta) = 2 \cdot A_x(\theta) \cdot A_y(\theta) \cdot \cos[\delta_y(\theta) - \delta_x(\theta)]$$

$$S_3(\theta) = 2 \cdot A_x(\theta) \cdot A_y(\theta) \cdot \sin[\delta_y(\theta) - \delta_x(\theta)] \quad \text{[Equations 18]}$$

A method for detecting the pretilt angle of a sample having a twisted orientation based upon Stokes parameters will be described below by using [Equations 10]~[Equations 18]. In the method explained hereinbelow, $\alpha^{in}$, $n_g^{in}$, $n_g^{out}$, $n_o$, $n_e$, $\Phi$ and $\lambda$ are assumed to be known. Manufacturer's catalogue values may be used for $n_g^{in}$, $n_g^{out}$, $n_o$, and $n_e$. Furthermore, for example, values obtained by performing measurements using the method disclosed in Japanese Patent No. 3023443 may be used.

First, transmitted light intensities $I_x(\theta)$, $I_y(\theta)$, $I_{xy}(\theta)$, and $I_{qxy}(\theta)$, which correspond to a plurality of light incident angles $\theta$ (sample rotation angle) of sample 3, are measured using the measurement device shown in FIG. 1. Then, Stokes parameters $S_0(\theta)$~$S_3(\theta)$ corresponding to light incident angles $\theta$ are calculated from the measured transmitted light intensities $I_x(\theta)$, $I_y(\theta)$, $I_{xy}(\theta)$, and $I_{qxy}(\theta)$ corresponding to the light incident angles $\theta$ by using [Equations 10] and [Equations 11].

Stokes parameters $S_0(\theta)$~$S_3(\theta)$ corresponding to light incident angles $\theta$ can be calculated by using [Equation 12]~[Equations 15] and [Equation 17]~[Equations 18] by considering the apparent retardation $\Delta n'd(\theta)$, which corresponds to light incident angles $\theta$, to be an unknown value. Thus, the electric field vector $E(\theta)$ of the light that passed through sample 3 is represented by [Equation 17] by using [Equation 12]~[Equations 15]. Then, Stokes parameters $S_0(\theta)$~$S_3(\theta)$ are calculated by using [Equation 18]. Stokes parameters $S_0(\theta)$~$S_3(\theta)$ corresponding to various light incident angles $\theta$, which were obtained by measurements, are compared with the calculated values obtained by considering the apparent retardation $\Delta n'd(\theta)$, which corresponds to light incident angles $\theta$, as an unknown value, and the apparent retardation $\Delta n'd(\theta)$, which corresponds to light incident angles $\theta$, is calculated, for example, by performing fitting.

Then, $[\theta_{LC}]$ having a positive correlation with the sample thickness (gap) d and the pretilt angle $\theta_s$ is calculated by using [Equation 16] from the calculated apparent retardation $\Delta n'd(\theta)$ corresponding to light incident angles $\theta$.

$[\theta_{LC}]$ is a quantity having a positive correlation with pretilt angle $\theta_s$. However, strictly speaking, it is not equal to the pretilt angle $\theta_s$. When the absolute value of pretilt angle $\theta_s$ is not required, e.g., when only variations of the pretilt angle $\theta_s$ may be determined for display production control, $[\theta_{LC}]$ may be considered to be the pretilt angle. Furthermore, by using a sample having an already known pretilt angle $\theta_s$, the calibration curve of $[\theta_{LC}]$ and the pretilt angle $\theta_s$ may be plotted and the pretilt angle $\theta_s$ may be determined from $[\theta_{LC}]$. Furthermore, the pretilt angle $\theta_s$ also may be determined from $[\theta_{LC}]$ by using the formula describing the relationship between $[\theta_{LC}]$ and $\theta_s$, as described in detail in the fourth embodiment.

Figure 2:
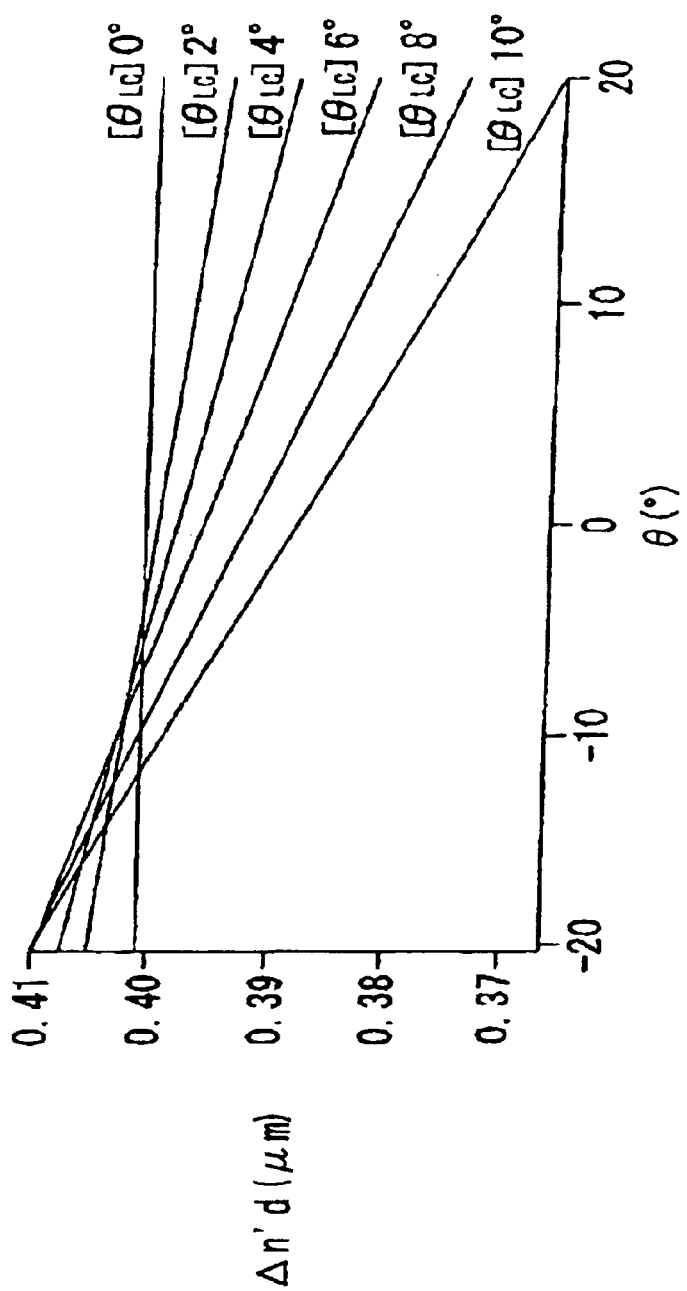
FIG. 2 illustrates the results of calculating apparent retardation for an incident angle by using the present invention.
Figure 3:
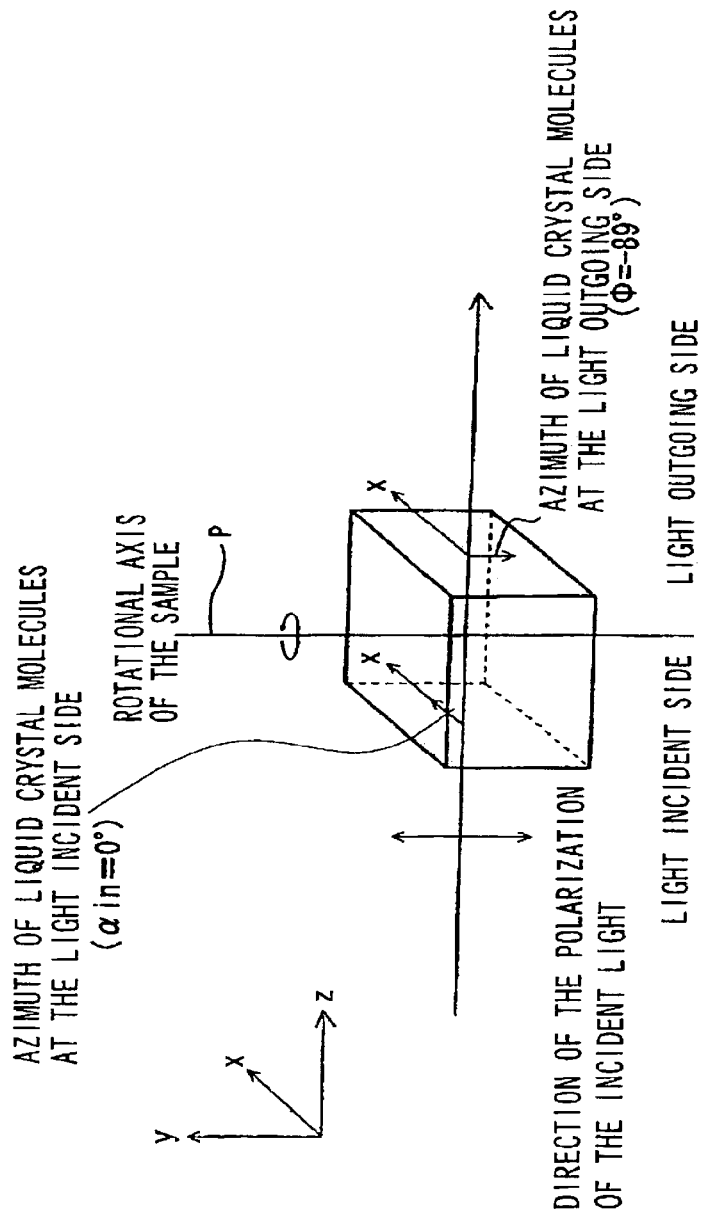
FIG. 3 illustrates a system of coordinates used for the calculations illustrated in FIG. 2.

[Equation 16] demonstrates that the apparent retardation $\Delta n'(\theta)d$ changes depending upon the light incident angle $\theta$, the sample thickness d, and $[\theta_{LC}]$ having a positive correlation with the pretilt angle $\theta_s$. FIG. 2 shows an example of the relationship between the apparent retardation $\Delta n'(\theta)d$ of the liquid-crystal layer and the light incident angle $\theta$ calculated from [Equation 18]. The system of coordinates used for the calculation is shown in FIG. 3. In FIG. 2, the light incident angle is plotted against the abscissa, and the apparent retardation $\Delta n'(\theta)d$ is plotted against the ordinate.

FIG. 2 shows that the shape of the $\Delta n'(\theta)d$–$\theta$ curve changes with $[\theta_{LC}]$. Furthermore, [Equation 16] demonstrates that the thickness d of the liquid-crystal layer relates to the value of the apparent retardation $\Delta n'(\theta)d$ and has no relation to the relative shape of the $\Delta n'(\theta)d$–$\theta$ curve. Therefore, it can be understood that $[\theta_{LC}]$ and the thickness d of the liquid crystal layer can be found by experimentally determining the $\Delta n'(\theta)d$–$\theta$ curve and then comparing the found $\Delta n'(\theta)d$–$\theta$ curve with [Equation 16].

However, when [Equation 16] was derived, an assumption was made that the changes in refractive index within the thin layers, which are obtained by dividing the liquid-crystal layer, are small. Furthermore, changes in the refractive index caused by twisted orientation were approximated using an average value. Therefore, those approximations will become invalid if the light incident angle θ increases. For this reason, the appropriate light incident angle θ is within ±20°, and preferably, within ±10°.

As described above, in the present embodiment, the pretilt angle can be determined by measuring the Stokes parameters, while changing the light incident angle on the sample having a twisted orientation. When $\alpha^{in}$ (azimuth of molecules at the light incident side interface) and Φ (twist angle of orientation) are determined by using the Stokes parameters, e.g., using the method disclosed in Japanese Patent No. 3023443, a series of parameters including the pretilt angle, can be determined by detecting only the Stokes parameters. The Stokes parameters can be readily measured using the simple optical system shown in FIG. 1 by using only monochromatic light of an arbitrary wavelength.

The merits of this method for detecting the pretilt angle $\theta_s$ and the sample thickness (gap) d by using the apparent retardation Δn'(θ)d as described in the present embodiment will be described below.

Complex simulation employed in the 4×4 matrix method is not required. Therefore, the amount of calculations can be greatly reduced. The pretilt angle $\theta_s$ and the sample thickness (gap) d can be determined by measuring only the transmitted light intensity of monochromatic light having any wavelength when the light incident angle is changed in the vicinity of the normal incident direction. Therefore, the measurement time can be shortened.

When the light incident angle variation range is large, the measurement point sometimes moves due to a shift of the rotational center of the sample. In this case, the reliability of the measurements may be lost if the sample thickness is non-uniform. In the present embodiment, this problem can be avoided and the reliability of the measurements is high even for samples having non-uniform thickness, because the light incident angle variation range may be narrow.

Third Embodiment

The apparent retardation Δn'(θ)d can be determined not only by a method using Stokes parameters. Thus, various methods can be used for this purpose, provided that the methods can detect the dependence of the apparent retardation Δn'(θ)d on the light incident angle θ.

A third method for detecting the transmitted light intensity based upon the dependence of the apparent retardation Δn'(θ)d on the light incident angle θ will be described below. This embodiment is especially effective when the pretilt angle is determined for a sample having a twisted orientation in which the twist angle is about ±90°, as in a liquid-crystal cell.

The transmissivity T(θ) of the sample having a twisted orientation, which is disposed between a polarizer and an analyzer, can be represented by [Equation 19]:

$$T(\theta) = \left[\cos(x\Phi) \cdot \cos(\Phi - \gamma) + \frac{\sin(x\Phi)}{x} \cdot \sin(\Phi - \gamma)\right]^2 +$$

$$\left[\frac{u}{x}\right]^2 \cdot \sin^2(x\Phi) \cdot \cos^2(\Phi - \gamma + 2\alpha)$$

$$u = \frac{\pi \cdot \Delta n'(\theta)d}{\Phi \lambda} \quad x = \sqrt{1 + u^2}$$

[Equation 19]

γ is the angle between the transmission axis (polarization axis) of the polarizer and the transmission axis (polarization axis) of the analyzer. Φ is the twist angle of the sample orientation. α is the angle between the transmission axis (polarization axis) of the polarizer and the azimuth direction of liquid crystal molecules at the light incident side interface.

If the twist angle Φ of orientation is assumed to be ±90° and a sample having a twisted orientation is disposed so that α=±45°, then the transmissivity $T_c(\theta)$ and $T_p(\theta)$ in a cross Nicol state and a parallel Nicol state can be represented by [Equation 20]. The cross Nicol state is a state in which the transmission axis of the polarizer is perpendicular to the transmission axis of the analyzer. Furthermore, the parallel Nicol state is a state in which the transmission axis of the polarizer is parallel to the transmission axis of the analyzer.

$$T_c(\theta) = \cos^2(x\Phi)$$

$$T_p(\theta) = \sin^2(x\Phi)$$

[Equations 20]

Thus, the apparent retardation Δn'(θ)d can be represented by [Equation 21]:

$$\Delta n'(\theta)d = \frac{\Phi}{\pi} \cdot \lambda \sqrt{x^2 - 1}$$

$$x = \frac{1}{\Phi} \tan^{-1} \sqrt{\frac{T_p(\theta)}{T_c(\theta)}}$$

[Equation 21]

Figure 4:
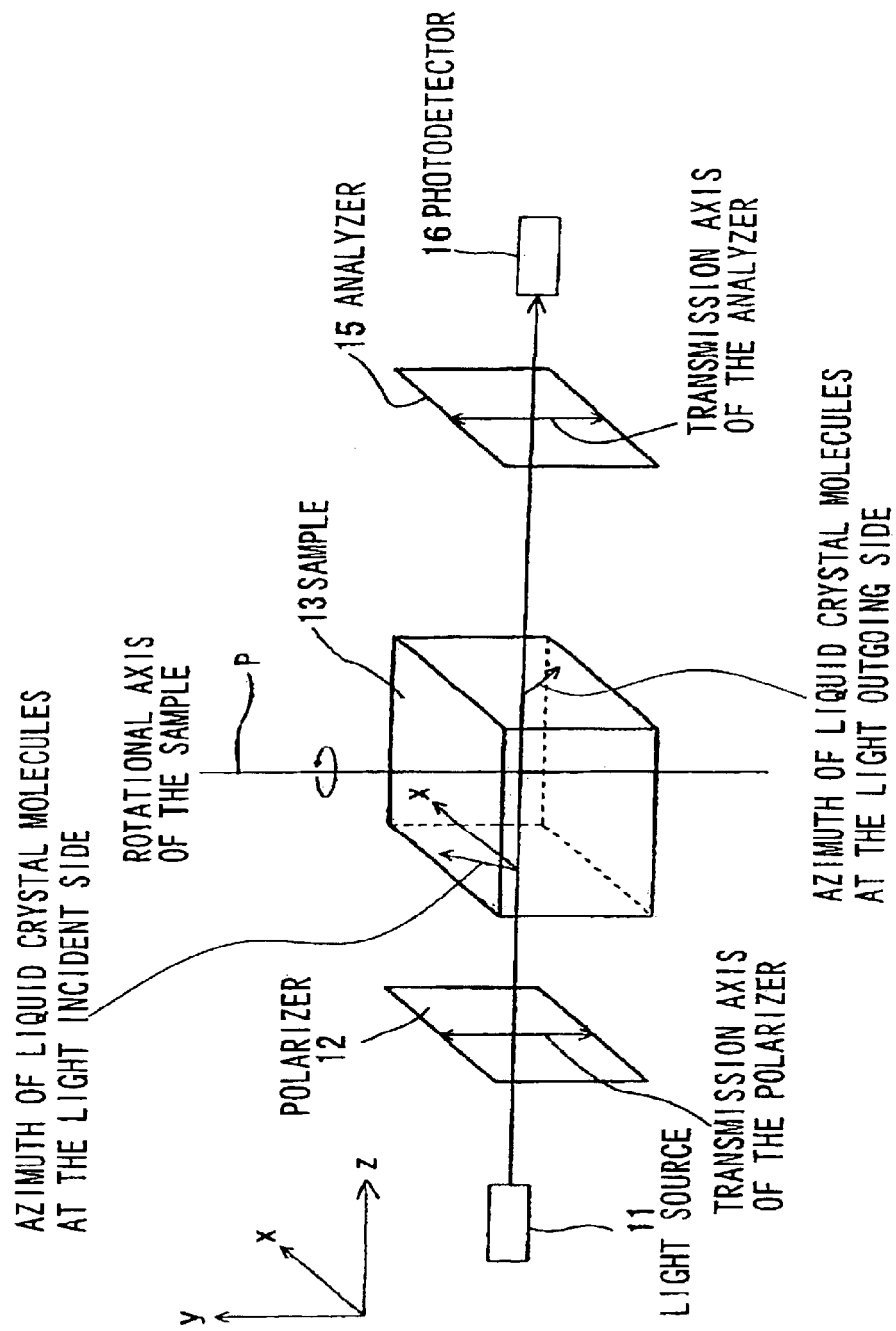
FIG. 4 illustrates another example of a measurement apparatus for measuring transmitted light intensity.

In this embodiment, for example, the measurement apparatus shown in FIG. 4 is used.

In the measurement apparatus shown in FIG. 4, a light source 11, a polarizer 12, a sample 13 having a twisted orientation (e.g., a liquid-crystal cell), an analyzer 15, and a photodetector 16 are disposed in an X-Y-Z system of coordinates having orthogonal axes X, Y, and Z.

The light source 11 emits light along the Z axis. The polarizer 12 is disposed parallel to the X-Y plane, which is perpendicular to the Z axis, and the transmission axis (polarization axis) thereof is set along the direction forming an angle of ±45° with respect to the azimuth of molecules at the light incident side interface. The analyzer 15 is disposed parallel to the X-Y plane and the transmission axis (polarization axis) thereof is disposed so that it can be set parallel and perpendicular to the axis of the polarizer 12. The sample 3 is disposed parallel to the X-Y plane, so that it can be rotated around the rotational axis P.

A white-light source, such as a halogen lamp, can be used as the light source 1. When a white-light source is used as the light source 1, a color filter for converting the light emitted from the light source 1 into monochromatic light is inserted between the light source 1 and the polarizer 2. Furthermore, a laser can also be used as the light source.

A method for measuring the transmitted light intensity in order to analyze the dependence of the apparent retardation Δn'(θ)d ([Equation 21]) on the light incident angle θ using such measurement apparatus will be described below.

The sample 13 is disposed in an optical system at an appropriate rotation angle (light incident angle) θ. The output signal of the photodetector 16 in the parallel Nicol state (the transmission axis of polarizer 12 and the transmission axis of analyzer 15 are parallel to each other) is considered to be a transmitted light intensity $I_p(\theta)$. Furthermore, the output signal of photodetector 16 in the cross Nicol state (the transmission axis of polarizer 12 and the transmission axis of analyzer 15 are perpendicular to each other) is considered to be a transmitted light intensity $I_c(\theta)$.

The transmitted light intensities $I_p(\theta)$, $I_c(\theta)$ and the transmissivity ratio $T_p(\theta)/T_c(\theta)$ contained in [Equation 21] satisfy the relationship described by [Equation 22]:

$$\frac{T_p(\theta)}{T_c(\theta)} = \frac{I_p(\theta)}{I_c(\theta)} \qquad \text{[Equation 22]}$$

Then, the sample 13 is rotated about the rotational axis P and the transmitted light intensities $I_p(\theta)$, $I_c(\theta)$ are measured at a plurality (at least two) rotation angles (light incident angle) $\theta$.

The measured transmitted light intensities $I_p(\theta)$, $I_c(\theta)$ for various light incident angles $\theta$ are substituted into [Equation 22] and the transmissivity ratio $T_p(\theta)/T_c(\theta)$ for the light incident angles is calculated.

Then, the apparent retardation $\Delta n'(\theta)d$ for the light incident angle $\theta$ is calculated by using [Equation 21].

Then, the sample thickness (gap) d and $[\theta_{LC}]$ having a positive correlation with the pretilt angle $\theta_s$ is calculated by using [Equation 16] based upon the calculated apparent retardation $\Delta n'd(\theta)$ corresponding to the light incident angle $\theta$.

$[\theta_{LC}]$ is a quantity having a positive correlation with the pretilt angle $\theta_s$. However, strictly speaking, it is in not equal to the pretilt angle $\theta_s$. When the absolute value of the pretilt angle $\theta_s$ is not required, e.g., when only variations of the pretilt angle $\theta_s$ may be determined for display production control, $[\theta_{LC}]$ may be considered to be the pretilt angle. Furthermore, by conducting measurements on a sample having an already known pretilt angle $\theta_s$, the calibration curve of $[\theta_{LC}]$ and pretilt angle $\theta_s$ may be plotted and the pretilt angle $\theta_s$ may be evaluated from $[\theta_{LC}]$. Furthermore, the pretilt angle $\theta_s$, may also be evaluated from $[\theta_{LC}]$ by using the formula that describes the relationship between $[\theta_{LC}]$ and $\theta_s$, as will be described in detail in the fourth embodiment.

The object of the measurements using the method of the present embodiment is a sample having a twisted orientation with an orientation twist angle of about ±90° and the method is not universal. However, the advantage of the method of the present embodiment over the method described in the second embodiment, which used Stokes parameters, is that it does not require the quarter-wave plate and number of the measured transmitted light intensities is small.

Fourth Embodiment

As described above, according to the method using the apparent retardation $\Delta n'd(\theta)$, $[\theta_{LC}]$ having a positive correlation with the pretilt angle $\theta_s$ is determined rather than the pretilt angle $\theta_s$ itself. Then, a calibration curve for determining the pretilt angle $\theta_s$ from $[\theta_{LC}]$ is plotted by performing measurements of a sample having a known pretilt angle $\theta_s$ and the pretilt angle $\theta_s$ is determined by evaluating the pretilt angle $\theta_s$ from $[\theta_{LC}]$ by using the calibration curve. In such method for detecting the pretilt angle $\theta_s$ from the $[\theta_{LC}]-\theta_s$ calibration curve, an increase in detection accuracy is limited. Accordingly, in the present embodiment, a method suitable for accurate detection of the pretilt angle is described. With such method, the pretilt angle $\theta_s$ is calculated from $[\theta_{LC}]$ by using mathematical equations.

First, a sample having a twisted orientation is disposed in an optical system so that [Equation 23] is satisfied.

$$\tan\alpha^{in} = -\frac{\Phi - \sin\Phi}{1 - \cos\Phi} \qquad \text{[Equation 23]}$$

Here, $\Phi$(rad) is the twist angle of the orientation of the sample having a twisted orientation. When $\Phi=0°$, the value of the right side of [Equation 23] becomes indeterminate. However, in this case, the following explanation is valid for any $\alpha^{in}$.

When the sample having a twisted orientation is disposed so that [Equation 23] is satisfied, the apparent retardation $\Delta n'd(\theta)$ can be represented by [Equation 24].

$$\Delta n'(\theta)d = [n_e'^0(\theta) - n_o'^0(\theta)] \cdot d \qquad \text{[Equations 24]}$$

$$n_e'^0(\theta) = -\frac{\varepsilon_{xz}^0}{\varepsilon_{zz}^0}X + \sqrt{\frac{n_e^2 \cdot n_o^2}{\varepsilon_{zz}^0} - \frac{\varepsilon_{xx}^0 \cdot \varepsilon_{zz}^0 - (\varepsilon_{xz}^0)^2}{(\varepsilon_{zz}^0)^2}X^2}$$

$$n_o'^0(\theta) = \sqrt{n_o^2 - X^2} \qquad X = n \cdot \sin\theta$$

$$\varepsilon_{zz}^0 = n_o^2 + (n_e^2 - n_o^2)\sin^2[\theta_{LC}]$$

$$\varepsilon_{xx}^0 = n_o^2 + (n_e^2 - n_o^2)\cos^2[\theta_{LC}] \cdot \cos^2\alpha^{in}$$

$$\varepsilon_{xz}^0 = (n_e^2 - n_o^2)\sin[\theta_{LC}] \cdot \cos[\theta_{LC}] \cdot \cos\alpha^{in}$$

Furthermore, when the sample having a twisted orientation is disposed so that [Equation 23] is satisfied, $[\theta_{LC}]$ can be represented by [Equation 25].

$$[\theta LC] = \frac{1}{d}\int_0^d \theta_{LC}(z) \cdot dz \qquad \text{[Equation 25]}$$

In other words, when the sample having a twisted orientation is disposed so that [Equation 23] is satisfied, $[\theta_{LC}]$ becomes an average tilt angle of the sample having a twisted orientation.

When $[\theta_{LC}]$ becomes an average tilt angle, the relationship between the $[\theta_{LC}]$ and pretilt angle $\theta_s$ is represented by [Equation 26].

$$\theta_s = \frac{[\theta_{LC}]}{1 - \frac{2}{\pi}\frac{C}{B}} \qquad \text{[Equation 26]}$$

$$\frac{C}{B} = \frac{\frac{2\Phi}{\pi}\left[2\left(\frac{2\pi d}{p} - \Phi\right)K_{22} + \Phi K_{33}\right]}{\pi\left[\frac{\pi}{2}K_{11} + \left(\frac{2\Phi d}{p} - \frac{\Phi^2}{2\pi}\right)K_{22} + \frac{\Phi^2}{2\pi}K_{33}\right]}$$

In these equations, p is a chiral pitch (one period of a spiral structure of a vertically aligned liquid crystal layer in a thick cell), and the units are the same as those of d. For example, if the units of d are $\mu$m, the units of p are also $\mu$m. $K_{11}$, $K_{22}$, $K_{33}$ are elastic constants for stretching, twisting, and bending deformations. Any units can be used for $K_{11} \sim K_{33}$, provided that the units match each other. In liquid crystal study, pN is usually used.

According to such a method for calculating the pretilt angle $\theta_s$ from $[\theta_{LC}]$ by using a mathematical formula, the pretilt angle $\theta_s$ can be accurately determined by employing the pretilt angle detection methods that were described in the second and third embodiments.

When the pretilt angle detection method described in the second embodiment is used, for example, the measurement apparatus shown in FIG. 1 is employed. When the pretilt angle detection method described in the third embodiment is used, for example, the measurement apparatus shown in FIG. 4 is employed.

First, a sample (sample 3 in the apparatus shown in FIG. 1 and sample 13 in the apparatus shown in FIG. 4) is disposed so that [Equation 23] is satisfied. In fact, it is difficult to dispose the sample so that [Equation 23] is fully satisfied. However, it is sufficient to dispose it within ±5°, and preferably, ±3° with respect to an azimuth $\alpha^{in}$ of molecules at the light incident side interface, which is determined from the twist angle $\Phi$ of orientation.

Then, the dependence of the apparent retardation $\Delta n'd(\theta)$ on the light incident angle $\theta$ is measured following the procedure described in the second embodiment or third embodiment. The rotational axis P of the sample is taken parallel to the Y axis.

Then, the average tilt angle (in this case [$\theta_{LC}$]) and sample thickness d are calculated by comparing the measured dependence of the apparent retardation $\Delta n'd(\theta)$ on the light incident angle $\theta$ using the dependence of the apparent retardation $\Delta n'd(\theta)$ on the light incident angle $\theta$ that was calculated by [Equation 24].

The pretilt angle $\theta_s$ of the sample is then calculated by [Equation 26] by using the calculated average tilt angle (in this case [$\theta_{LC}$]). For example, the values of p, $K_{11}$, $K_{22}$, $K_{33}$ presented in a manufacturer's catalogue can be used for the calculations.

As described above, the pretilt angle $\theta_s$ of a sample having a twisted orientation can be determined with higher accuracy by using this embodiment.

EXAMPLE 1

A TN liquid-crystal cell having a twist angle $\Phi=-90°$ of orientation (negative sign indicates a counter-clockwise twist) was used as a sample with twisted orientation. A rubbing method was used for orientation processing. The fabrication method is described below.

First, a glass substrate having transparent electrodes was spin coated with polyimide so as to obtain a 70 nm film and an orientated film was obtained by rubbing the surface with a nylon cloth. The two substrates were then bonded to each other with an adhesive mixed with resin beads having a diameter of 5 $\mu$m. The adhesive bonding was performed so that the oriented films faced each other and the rubbing directions were perpendicular to each other. A TN liquid-crystal cell was then fabricated by injecting the liquid crystal by means of capillary effect.

The pretilt angle of the horizontally oriented cell (a cell bonded so that the rubbing directions of two substrates are parallel but opposite to each other) fabricated under the same rubbing conditions was then measured by the crystal rotation method. The result was about 6°.

First, Stokes parameters of the TN liquid-crystal cell were measured by using the measurement apparatus shown in FIG. 1. Then, the twist angle $\Phi$ of orientation and the azimuth $\alpha^{in}$ of liquid crystal molecules at the light incident side interface were determined from the measured Stokes parameters. The following results were obtained: $\Phi=-89.70$, $\alpha^{in}=0.24$ degree.

The TN liquid-crystal cell was then rearranged so as to obtain $\alpha^{in}=0$. In such case, $<R^{in}>$, $<R^{out}>$ shown in [Equation 13] become unit matrixes and the calculation is simplified.

Figure 5:
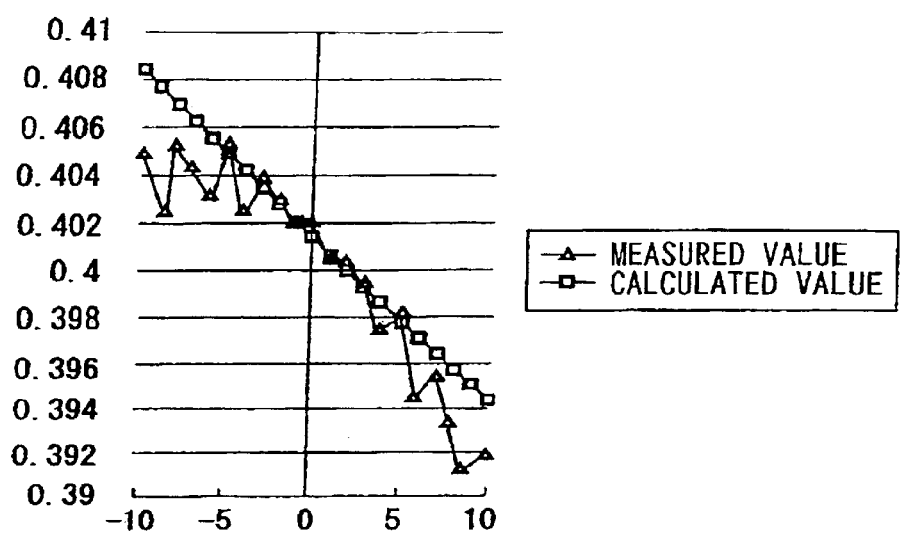
FIG. 5 illustrates measured apparent retardation and apparent retardation calculated based upon Stokes parameters.

The Stokes parameters were then measured while rotating the TN liquid-crystal cell about the rotational axis P shown in FIG. 1. The apparent retardation $\Delta n'd(\theta)$ was calculated from the measured Stokes parameters by using [Equation 12]~[Equation 15] and [Equation 17]~[Equation 18]. The results of the calculations are shown in FIG. 5. In FIG. 5, the light incident angle $\theta$ (°) is plotted against the abscissa, and the apparent retardation $\Delta n'd(\theta)$ is plotted against the ordinate.

The calculated apparent retardation $\Delta n'd(\theta)$ was fitted within a range of the light incident angle of ±5° according to [Equation 16]. The following results were obtained: thickness of the liquid-crystal layer d=4.67 $\mu$m, [$\theta_{LS}$] having a positive correlation with the pretilt angle $\theta_s$ being 6.63°.

EXAMPLE 2

A sample having a twist-free horizontal orientation was fabricated. The sample fabrication procedure was the same as in Example 1. A series of samples were fabricated in which the pretilt angle was changed by modifying the oriented film material.

Figure 6:
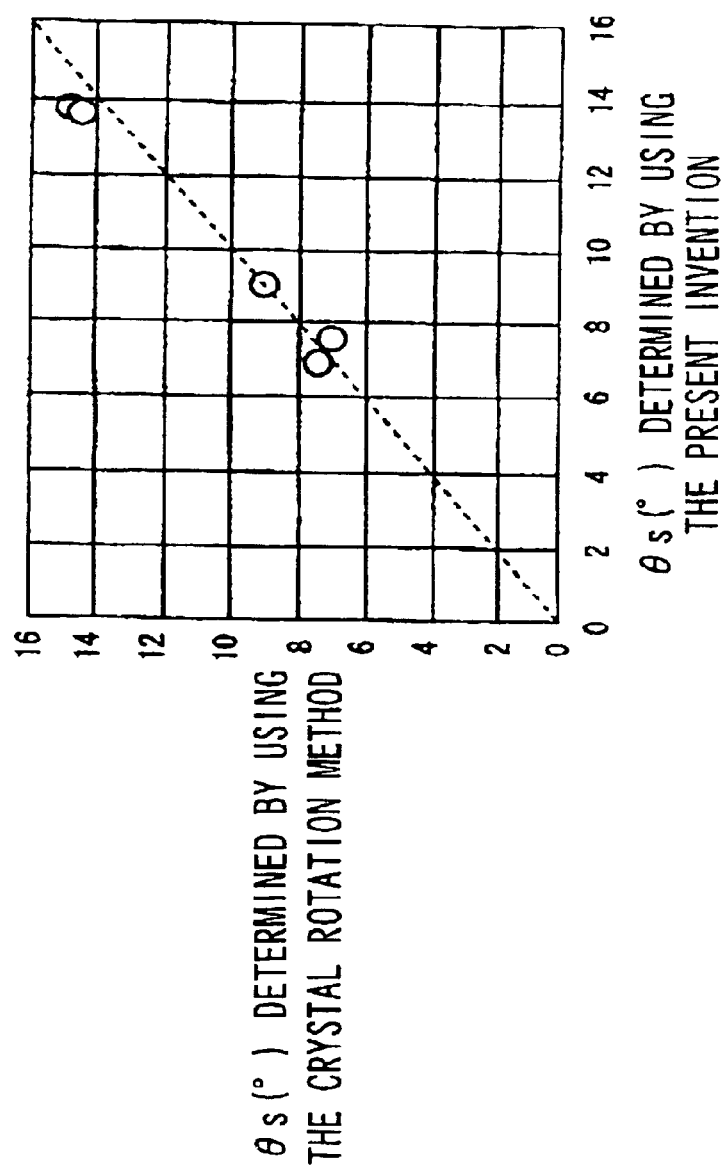
FIG. 6 illustrates a relationship between the pretilt angle $\theta_s$ determined by using a detection method in accordance with the present invention and the pretilt angle $\theta_s$ determined by using the crystal rotation method for a twist-free sample.

The pretilt angles of the series of samples having horizontal orientation were measured. The samples were disposed so as to provide $\alpha^{in}=30°$. The results are shown in FIG. 6. In FIG. 6, values of the pretilt angle $\theta_s$ of cells having horizontal orientation fabricated under the same conditions were plotted against the abscissa; those values were obtained by taking measurements using the crystal rotation method. The results obtained by measuring the pretilt angle $\theta_s$ in accordance with the present invention were plotted against the ordinate. [$\theta_{LC}$] was obtained by fitting the apparent retardation $\Delta n'd(\theta)$ of samples using a horizontal orientation in the range of the light incident angle of ±3° according to [Equation 16]. In the case of samples having horizontal orientation, the tilt angle is constant within the liquid-crystal cell. Therefore, [$\theta_{LS}$]=$\theta_s$. The values of pretilt angle $\theta_s$, which were obtained using the two different methods, are almost the same.

EXAMPLE 3

A series of samples having a twisted orientation (TN liquid-crystal cell) in which the pretilt angle was changed by modifying the oriented film material were fabricated following the same procedure as in Example 1.

First, similar to Example 1, the pretilt angles of the series of TN liquid-crystal cells were measured. The samples were disposed so as to provide $\alpha^{in}=\tan^{-1}[(\sin \Phi-1)/(1-\cos \Phi)]=29.7°$.

Figure 7:
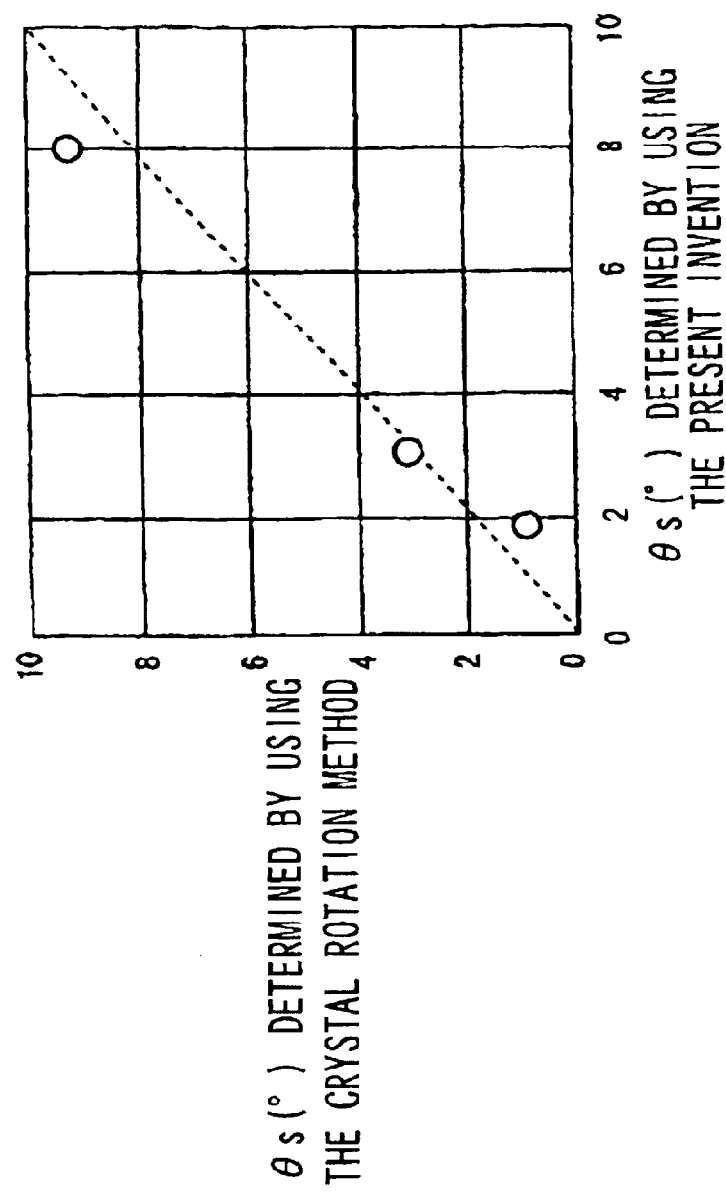
FIG. 7 illustrates the relationship between the pretilt angle $\theta_s$ determined by using the present invention and the pretilt angle $\theta_s$ determined by using the crystal rotation method.

The average tilt angle [$\theta_{LC}$] was obtained by fitting the measured apparent retardation $\Delta n'd(\theta)$ of TN liquid crystal cells in the range of the light incident angle of ±3° according to [Equation 16]. This average tilt angle [$\theta_{LC}$] was converted to the pretilt angle $\theta_s$ using [Equation 26]. The results are shown in FIG. 7. The values of the pretilt angle $\theta_s$ of cells having horizontal orientation fabricated under the same conditions were plotted against the abscissa; those values were obtained by taking measurements using the crystal rotation method.

As shown in FIG. 7, the pretilt angle $\theta_s$ of cells having a horizontal orientation fabricated under the same conditions and the pretilt angle $\theta_s$ of TN liquid-crystal cells had almost the same values.

In the above-described embodiments, the explanation was focused on the detection of the pretilt angle of liquid-crystal cells. The present invention is, however, also applicable to elements other than liquid-crystal cells. For example, it can be also used for detecting the pretilt angle of retardar plates having organic films, in which the main axis of refractive index is tilted from the normal direction.

Furthermore, the rotation axis of the samples was set horizontal to the Y axis. Such configuration is, however, not limiting and it can be set in other directions, for example, parallel to the X axis. Moreover, rotation of samples or movement of the optical system can be used to change the light incident angle. In addition, the typical and simple configuration of optical system elements is not limiting.

The apparent retardation $\Delta n'd(\theta)$ can be determined by various methods and not only by the method described in the embodiments.

Furthermore, the present invention can provide pretilt angle detection methods or pretilt angle detection apparatus.

What is claimed is:

1. A method for detecting a pretilt angle of an element in which the direction of orientation of molecules is twisted from a light incident side to light outgoing side, the method comprising:

measuring transmitted light intensity of light from the light incident side for a plurality of light incident angles by rotating the element about an axis perpendicular to the direction of transmitted light towards the element;

analyzing dependence of the measured transmitted light intensity for the plurality of light incident angles wherein an apparent retardation for the plurality of light incident angles is determined based upon the measured transmitted light intensity for the plurality of light incident angle wherein the pretilt angle of the element is determined based upon the determined apparent retardation for the plurality of light incident angles; and determining the pretilt angle of the element based upon the analysis results wherein an average tilt angle is determined based upon the determined apparent retardation for the plurality of light incident angles, and the pretilt angle is determined based upon the determined average tilt angle.

2. A method for detecting a pretilt angle of an element in which the direction of orientation of molecules is twisted from a light incident side to light outgoing side, the method comprising:

measuring transmitted light intensity of light from the light incident side for a plurality of light incident angles by rotating the element about an axis perpendicular to the direction of transmitted light towards the element wherein the transmitted light intensity is measured in a state in which the following relationship is valid between the orientation direction $\alpha^{in}$ (rad) of molecules at the light incident side interface of the element and the twist angle $\Phi$ (rad) of the element:

$$\tan\alpha^{in} = -\frac{\Phi - \sin\Phi}{1 - \cos\Phi}$$

analyzing dependence of the measured transmitted light intensity for the plurality of light incident angles wherein an apparent retardation for the plurality of light incident angles is determined based upon the measured transmitted light intensity for the plurality of light incident angles; and determining the pretilt angle of the element based upon the analysis results wherein the pretilt angle of the element is determined based upon the determined apparent retardation for the plurality of light incident angles.

3. A method for detecting a pretilt angle of an element in which the direction of orientation of molecules is twisted from a light incident side to light outgoing side, the method comprising:

measuring transmitted light intensity of light from the light incident side for a plurality of light incident angles by rotating the element about an axis perpendicular to the direction of transmitted light towards the element, wherein the transmitted light intensity is measured in a state in which the following relationship is valid between the orientation direction $\alpha^{in}$ (rad) of molecules at the light incident side interface of the element and the twist angle $\Phi$ (rad) of the element:

$$\tan\alpha^{in} = -\frac{\Phi - \sin\Phi}{1 - \cos\Phi}$$

analyzing dependence of the measured transmitted light intensity for the plurality of light incident angles, wherein Stokes parameters for the plurality of light incident angles are determined based upon the measured transmitted light intensity for the plurality of light incident angles, wherein the pretilt angle of the element is determined based upon the determined Stokes parameters for the plurality of light incident angles; and determining the pretilt angle of the element based upon the analysis results.

4. A method for detecting a pretilt angel of an element in which the direction of orientation of molecules is twisted from a light incident side to a light outgoing side, the method comprising:

measuring transmitted light intensity of light from the light incident side far a plurality of light incident angles by rotating the element about an axis perpendicular to the direction of transmitted light towards the element and at a plurality of optical element arrangements for each light incident angle;

analyzing dependence of the measured transmitted light intensity for the plurality of light incident angles wherein wherein Stokes parameters for the plurality of light incident angles are determined based upon the measured transmitted light intensity for the plurality of light incident angles, and wherein the pretilt angle of the element is determined based upon the determined Stokes parameters for the plurality of light incident angles; and determining the pretilt angle of the element based upon the analysis results wherein, an apparent retardation for the plurality of light incident angles is determined based upon the determined Stokes parameters for the plurality of light incident angles, and the pretilt angle of the element is determined based upon the determined apparent retardation for the plurality of light incident angles and wherein, an average tilt angle is determined based upon the determined retardation for the plurality of light incident angles, and the pretilt angel is determined based upon the determined average tilt angle.

5. The method as described in claim 4, wherein in the step of measuring the transmitted light intensity for the plurality of light incident angles, monochromatic light is incident from the light incident side.

6. A method for detecting a pretilt angel of an element in which the direction of orientation of molecules is twisted from a light incident side to a light outgoing side, the method comprising:

measuring transmitted light intensity of light from the light incident side for a plurality of light incident angles by rotating the clement about an axis perpendicular to the direction of transmitted light towards the element and at a plurality of optical element arrangements for each light incident angle wherein the transmitted light intensity is measured in a state in which the following relationship is valid between the orientation direction $\alpha^{in}$ (rad) of molecules at the light incident side interface of the element and the twist angle Φ (rad) of the element:

$$\tan\alpha^{in} = -\frac{\Phi - \sin\Phi}{1 - \cos\Phi}$$

analyzing dependence of the measured transmitted light intensity for the plurality of light incident angles wherein Stokes parameters for the plurality of light incident angles are determined based upon the measured transmitted light intensity for the plurality of light incident angles; and determining the pretilt angle of the element based upon the analysis results wherein, an apparent retardation for the plurality of light incident angles is determined based upon the determined Stokes parameters for the plurality of light incident angles, and the pretilt angle of the element is determined based upon the determined apparent retardation for the plurality of light incident angles.

7. An apparatus for detecting a pretilt angle arranged in the following sequence: a light source, a polarizer, an element in which the direction of orientation of molecules is twisted from a light incident side to a light outgoing side, an analyzer, and a photodetector, wherein the apparatus also comprises a processing device for processing output signals from the photodetector, the processing device analyzes the dependence of transmitted light intensity on a light incident angle based upon the transmitted light intensities for a plurality of light incident angles that were output from the photodetector;

wherein a plurality of light incident angles are determined by rotating the element about an axis perpendicular to the direction of light from the light source, in which light is transmitted in the direction towards the element, and detects the pretilt angle of the element based upon the analysis;

wherein the processing device analyzes the dependence of the transmitted light intensity on the light incident angle based upon the transmitted light intensities for a plurality of optical element arrangements for each of the plurality of light incident angles that was output from the photodetector, and detects the pretilt angle of the element based upon the analysis results;

wherein the processing device detects an apparent retardation for the plurality of light incident angles based upon the transmitted light intensities output from the photodetector and detects the pretilt angle of the element based upon the determined apparent retardation for the plurality of light incident angles; and wherein the processing device determines the average tilt angle based upon the determined apparent retardation for the plurality of light incident angles and determines the pretilt angle based upon the determined average tilt angle.

8. An apparatus for detecting a pretilt angle arranged in the following sequence: a light source, a polarizer, an element in which the direction of orientation of molecules is twisted from a light incident side to a light outgoing side, an analyzer, and a photodetector, wherein the apparatus also comprises a processing device for processing output signals from the photodetector, the processing device analyzes the dependence of transmitted light intensity on a light incident angle based upon the transmitted light intensities for a plurality of light incident angles that were output from the photodetector, wherein a plurality of light incident angles are determined by rotating the element about an axis perpendicular to the direction of light from the light source, in which light is transmitted in the direction towards the element, and detects the pretilt angle of the element based upon the analysis wherein the processing device analyzes the dependence of the transmitted light intensity on the light incident angle based upon the transmitted light intensities for a plurality of optical element arrangements for each of the plurality of light incident angles that was output from the photodetector, and detects the pretilt angle of the element based upon the analysis results;

wherein the processing device detects an apparent retardation for the plurality of light incident angles based upon the transmitted light intensities output from the photodetector and detects the pretilt angle of the element based upon the determined apparent retardation for the plurality of light incident angles; and wherein the pretilt angle is determined based upon the transmitted light intensity in a state in which the following relationship is valid between the orientation direction $\alpha^{in}$ (rad) of molecules at the light incident side interface of the element and the twist angle Φ (rad) of the element:

$$\tan\alpha^{in} = -\frac{\Phi - \sin\Phi}{1 - \cos\Phi}.$$

9. An apparatus for detecting a pretilt angle arranged in the following sequence: a light source, a polarizer, an element in which the direction of orientation of molecules is twisted from a light incident side to a light outgoing side, an analyzer, and a photodetector, wherein the apparatus also comprises a processing device for processing output signals from the photodetector, the processing device analyzes the dependence of transmitted light intensity on a light incident angle based upon the transmitted light intensities for a plurality of light incident angles that were output from the photodetector;

wherein a plurality of light incident angles are determined by rotating the element about an axis perpendicular to the direction of light from the light source, in which light is transmitted in the direction towards the element, and detects the pretilt angle of the element based upon the analysis;

wherein the processing device analyzes the dependence of the transmitted light intensity on the light incident angle based upon the transmitted light intensities for a plurality of optical element arrangements for each of the plurality of light incident angles that was output from the photodetector, and the processing device determines the pretilt angle of the element based upon the analysis results;

wherein the processing device calculates Stokes parameters for the plurality of light incident angles based upon the transmitted light intensity output from the photodetector and determines the pretilt angle of the element based upon the determined Stokes parameters for the plurality of light incident angles; and wherein the processing device determines the average tilt angle based upon the determined apparent retardation for the plurality of light incident angles and determines the pretilt angle based upon the determined average tilt angle.

10. An apparatus for detecting a pretilt angle arranged in the following sequence: a light source, a polarizer, an element in which the direction of orientation of molecules is twisted from a light incident side to a light outgoing side, an analyzer, and a photodetector, wherein the apparatus also comprises a processing device for processing output signals from the photodetector, the processing device analyzes the dependence of transmitted light intensity on a light incident angle based upon the transmitted light intensities for a plurality of light incident angles that were output from the photodetector, wherein a plurality of light incident angles are determined by rotating the element about an axis perpendicular to the direction of light from the light source, in which light is transmitted in the direction towards the element, and the processing device determines the pretilt angle of the element based upon the analysis wherein the processing device analyzes the dependence of the transmitted light intensity on the light incident angle based upon the transmitted light intensities for a plurality of optical element arrangements for each of the plurality of light incident angles that was output from the photodetector, and detects the pretilt angle of the element based upon the analysis results;

wherein the processing device calculates Stokes parameters for the plurality of light incident angles based upon the transmitted light intensity output from the photodetector and determines the pretilt angle of the element based upon the determined Stokes parameters for the plurality of light incident angles; and wherein the pretilt angle is determined based upon the transmitted light intensity in a state in which the following relationship is valid between the orientation direction $\alpha^{in}$ (rad) of molecules at the light incident side interface of the element and the twist angle $\Phi$ (rad) of the element:

$$\tan\alpha^{in} = -\frac{\Phi - \sin\Phi}{1 - \cos\Phi}.$$

11. An apparatus for detecting a pretilt angle arranged in the following sequence: a light source, a polarizer, an element in which the direction of orientation of molecules is twisted from a light incident side to a light outgoing side, an analyzer, and a photodetector, wherein the apparatus also comprises a processing device for processing output signals from the photodetector, the processing device analyzes the dependence of transmitted light intensity on a light incident angle based upon the transmitted light intensities for a plurality of light incident angles that were output from the photodetector wherein a plurality of light incident angles are determined by rotating the element about an axis perpendicular to the direction of light from the light source, in which light is transmitted in the direction towards the element, and the processing device determines the pretilt angle of the element based upon the analysis;

wherein a quarter-wave plate is provided between the element and the analyzer;

wherein the processing device analyzes the dependence of the transmitted light intensity on the light incident angle based upon the transmitted light intensities for a plurality of optical element arrangements for each of the plurality of light incident angles that was output from the photodetector, and detects the pretilt angle of the element based upon the analysis results;

wherein the processing device detects an apparent retardation for the plurality of light incident angles based upon the transmitted light intensities output from the photodetector and detects the pretilt angle of the element based upon the determined apparent retardation for the plurality of light incident angles; and wherein the processing device determines the average tilt angle based upon the determined apparent retardation for the plurality of light incident angles and determines the pretilt angle based upon the determined average tilt angle.

12. An apparatus for detecting a pretilt angle arranged in the following sequence: a light source, a polarizer, an element in which the direction of orientation of molecules is twisted from a light incident side to a light outgoing side, an analyzer, and a photodetector, wherein the apparatus also comprises a processing device for processing output signals from the photodetector, the processing device analyzes the dependence of transmitted light intensity on a light incident angle based upon the transmitted light intensities for a plurality of light incident angles that were output from the photodetector, wherein a plurality of light incident angles are determined by rotating the element about an axis perpendicular to the direction of light from the light source, in which light is transmitted in the direction towards the element, and the processing device determines the pretilt angle of the element based upon the analysis;

wherein a quarter-wave plate is provided between the element and the analyzer;

wherein the processing device analyzes the dependence of the transmitted light intensity on the light incident angle based upon the transmitted light intensities for a plurality of optical element arrangements for each of the plurality of light incident angles that was output from the photodetector, and detects the pretilt angle of the element based upon the analysis results;

wherein the processing device detects an apparent retardation for the plurality of light incident angles based upon the transmitted light intensities output from the photodetector and detects the pretilt angle of the element based upon the determined apparent retardation for the plurality of light incident angles; and wherein the pretilt angle is determined based upon the transmitted light intensity in a state in which the following relationship is valid between the orientation direction $\alpha^{in}$ (rad) of molecules at the light incident side interface of the element and the twist angle $\Phi$ (rad) of the element:

$$\tan\alpha^{in} = -\frac{\Phi - \sin\Phi}{1 - \cos\Phi}.$$

13. An apparatus for detecting a pretilt angle arranged in the following sequence: a light source, a polarizer, an element in which the direction of orientation of molecules is twisted from a light incident side to a light outgoing side, an analyzer, and a photodetector, wherein the apparatus also comprises a processing device for processing output signals from the photodetector, the processing device analyzes the dependence of transmitted light intensity on a light incident angle based upon the transmitted fight intensities for a plurality of light incident angles that were output from the photodetector, wherein a plurality of light incident angles are determined by rotating the element about an axis perpendicular to the direction of light from the light source, in which light is transmitted in the direction towards the element, and the processing device determines the pretilt angle of the element based upon the analysis;

wherein a quarter-wave plate is provided between the element and the analyzer;

wherein the processing device analyzes the dependence of the transmitted light intensity on the light incident angle based upon the transmitted light intensities for a plurality of optical element arrangements for each of the plurality of light incident angles that was output from the photodetector, and detects the pretilt angle of the element based upon the analysis results;

wherein the processing device calculates Stokes parameters for the plurality of light incident angles based upon the transmitted light intensity output from the photodetector and determines the pretilt angle of the element based upon the determined Stokes parameters for the plurality of light incident angles; and wherein the processing device determines the average tilt angle based upon the determined apparent retardation for the plurality of light incident angles and determines the pretilt angle based upon the determined average tilt angle.

14. An apparatus for detecting a pretilt angle arranged in the following sequence: a light source, a polarizer, an element in which the direction of orientation of molecules is twisted from a light incident side to a light outgoing side, an analyzer, and a photodetector, wherein the apparatus also comprises a processing device for processing output signals from the photodetector, the processing device analyzes the dependence of transmitted light intensity on a light incident angle based upon the transmitted light intensities for a plurality of light incident angles that were output from the photodetector, wherein a plurality of light incident angles are determined by rotating the element about an axis perpendicular to the direction of light from the light source, in which light is transmitted in the direction towards the element, and the processing device determines the pretilt angle of the element based upon the analysis;

wherein a quarter-wave plate is provided between the element and the analyzer;

wherein the processing device analyzes the dependence of the transmitted light intensity on the light incident angle based upon the transmitted light intensities for a plurality of optical element arrangements for each of the plurality of light incident angles that was output from the photodetector, and detects the pretilt angle of the element based upon the analysis results;

wherein the processing device calculates Stokes parameters for the plurality of light incident angles based upon the transmitted light intensity output from the photodetector and determines the pretilt angle of the element based upon the determined Stokes parameters for the plurality of light incident angles; and wherein the pretilt angle is determined based upon the transmitted light intensity in a state in which the following relationship is valid between the orientation direction $\alpha^{in}$ (rad) of molecules at the light incident side interface of the element and the twist angle $\Phi$ (rad) of the element:

$$\tan\alpha^{in} = -\frac{\Phi - \sin\Phi}{1 - \cos\Phi}.$$

* * * * *